US011950124B2

(12) United States Patent
Chen et al.

(10) Patent No.: US 11,950,124 B2
(45) Date of Patent: Apr. 2, 2024

(54) METHODS, APPARATUS AND SYSTEMS FOR INTEGRATED ACCESS AND BACKHAUL BEARER MANAGEMENT

(71) Applicant: ZTE CORPORATION, Guangdong (CN)

(72) Inventors: Lin Chen, Guangdong (CN); Ying Huang, Guangdong (CN); Wei Luo, Guangdong (CN); Mengzhen Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/170,516

(22) Filed: Feb. 8, 2021

(65) Prior Publication Data
US 2021/0168646 A1 Jun. 3, 2021

Related U.S. Application Data

(63) Continuation of application No. PCT/CN2018/099695, filed on Aug. 9, 2018.

(51) Int. Cl.
*H04W 28/02* (2009.01)
*H04W 28/10* (2009.01)
(Continued)

(52) U.S. Cl.
CPC ... *H04W 28/0268* (2013.01); *H04W 28/0263* (2013.01); *H04W 28/10* (2013.01);
(Continued)

(58) Field of Classification Search
CPC ......... H04W 28/0268; H04W 28/0263; H04W 28/10; H04W 28/0252; H04W 28/12;
(Continued)

(56) References Cited

U.S. PATENT DOCUMENTS

2004/0029528 A1* 2/2004 Chandler ................. H04Q 3/66
455/12.1
2010/0103845 A1* 4/2010 Ulupinar ............... H04W 40/22
370/254
(Continued)

FOREIGN PATENT DOCUMENTS

CN 108366391 A 8/2018
WO WO-2018063453 A1 * 4/2018 ............. H04L 47/12
(Continued)

OTHER PUBLICATIONS

ZTE "QoS information transfer over FI interface" 3GPP TSG RAN WG3 NR Adhoc, R3-180123, Sophia Antipolis, France; Jan. 22, 2018-Jan. 26, 2018, Jan. 12, 2018, 2 pages.

*Primary Examiner* — Sudesh M Patidar
(74) *Attorney, Agent, or Firm* — Duane Morris LLP

(57) ABSTRACT

A method for data radio bearer management, the method including: transmitting a data radio bearer (DRB) setup request message to a wireless communication node; receiving a DRB setup response message from the wireless communication node, determining at least one DRB and at least one Quality of Service (QoS) flow mapped to the at least one DRB supported by the wireless communication node; and configuring the wireless communication node to support the at least one DRB and the at least one QoS flow.

19 Claims, 11 Drawing Sheets

(51) Int. Cl.
*H04W 76/11* (2018.01)
*H04W 76/27* (2018.01)
*H04W 88/14* (2009.01)

(52) U.S. Cl.
CPC ............ *H04W 76/11* (2018.02); *H04W 76/27* (2018.02); *H04W 88/14* (2013.01)

(58) Field of Classification Search
CPC . H04W 28/0273; H04W 40/02; H04W 76/11; H04W 76/27; H04W 76/18; H04W 72/087; H04W 72/08; H04W 80/02; H04W 88/14; H04W 84/047; H04W 88/085
See application file for complete search history.

(56) References Cited

U.S. PATENT DOCUMENTS

| | | | | |
|---|---|---|---|---|
| 2010/0316048 | A1* | 12/2010 | Reyes | H04L 12/66 370/389 |
| 2012/0243460 | A1* | 9/2012 | Muto | H04L 45/24 370/328 |
| 2013/0265872 | A1* | 10/2013 | Noh | H04B 7/15542 370/232 |
| 2016/0088127 | A1* | 3/2016 | Cai | H04W 28/0205 370/328 |
| 2016/0249259 | A1 | 8/2016 | Park | |
| 2017/0215173 | A1 | 7/2017 | Zhu et al. | |
| 2018/0199398 | A1 | 7/2018 | Dao | |
| 2018/0368109 | A1* | 12/2018 | Kim | H04W 72/04 |
| 2019/0230681 | A1* | 7/2019 | Han | H04W 24/10 |
| 2019/0313244 | A1* | 10/2019 | Wang | H04W 36/0033 |
| 2019/0327641 | A1* | 10/2019 | Mok | H04L 1/08 |
| 2020/0015116 | A1 | 1/2020 | Huang | |
| 2020/0120750 | A1* | 4/2020 | Liu | H04W 76/11 |
| 2021/0105698 | A1* | 4/2021 | Jactat | H04W 28/0263 |
| 2021/0144579 | A1* | 5/2021 | Ke | H04W 76/30 |
| 2021/0160729 | A1* | 5/2021 | Agiwal | H04W 28/0268 |
| 2021/0160730 | A1* | 5/2021 | Fiorani | H04W 28/0268 |
| 2021/0243672 | A1* | 8/2021 | Deshmukh | H04W 40/22 |
| 2021/0258244 | A1* | 8/2021 | Xu | H04L 45/28 |

FOREIGN PATENT DOCUMENTS

| | | | |
|---|---|---|---|
| WO | 2018131902 A1 | 7/2018 | |
| WO | 2018137458 A1 | 8/2018 | |
| WO | WO-2018210038 A1 * | 11/2018 | ............ H04W 76/38 |

* cited by examiner

METHODS, APPARATUS AND SYSTEMS FOR INTEGRATED ACCESS AND BACKHAUL BEARER MANAGEMENT

TECHNICAL FIELD

This disclosure relates generally to wireless communications and, more particularly, to methods, apparatus and systems for transmitting indication information for determining a transmission resource configuration in a wireless communication.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today. The performance requirements placed on the network will demand connectivity in terms of data rate, latency, QOS, security, availability, and many other parameters, all of which will vary from one service to the next. Thus, enabling a network to allocate resources in a flexible manner to provide customized connectivity for each different type of service will greatly enhance the network's ability to meet future demands.

To meet these demands, the development of 5$^{th}$ Generation (5G) mobile wireless technologies and standards are well underway. One such technology is a split network architecture wherein the Radio Access Network (RAN) functionality is split between a Central Unit (CU) and multiple Distributed Units (DUs). For example, RAN functions may be split at the point between the Packet Data Convergence Protocol (PDCP) layer and the Radio Link Control (RLC) layer of the 5G protocol stack, wherein DUs will handle all processes up to and including the RLC layer functions and the CU will handle PDCP layer and higher layer functions prior to the core network. This disaggregation of RAN functions will provide numerous advantageous to mobile network operators. For example, through the isolation of the stack from the PDCP layer and upwards, the CU will be able to act as a Cloud-based convergence point among multiple heterogeneous technologies in the provisioned networks and hence will be able to serve multiple heterogeneous DUs.

Another technology being developed for 5G networks is an Integrated Access and Backhaul (IAB) architecture for providing high-speed wireless backhaul to cell sites (e.g., base stations). As data demands and the number of cell sites increase, it is becoming more difficult to provide traditional fiber optic backhaul access to each cell site, which is especially true for small cell base stations. Under the IAB architecture, the same infrastructure and resources (e.g., IAB nodes) can be used to provide both access and backhaul to support User Equipment (UE) Packet Data Unit (PDU) sessions, for example. The IAB architecture for New Radio (NR) networks will provide wireless backhaul and relay links enabling flexible and dense deployment of NR cells without the need for densifying the transport network proportionately. Additionally, IAB technologies will allow for easier deployment of a dense network of self-backhauled NR cells in a more integrated and robust manner. For example, the IAB technology in the 5G NR network will support a multi-hop relay system, where the network topology also supports redundant connections.

FIG. 1 illustrates a block diagram of an IAB architecture network 100 wherein a core network 102 is connected to a donor IAB node 104. As used herein, the term "connected" refers to a wired or cabled connection (e.g., a fiber optic cable) between two nodes or devices. The donor IAB node 104 is wirelessly coupled to a plurality of intermediate IAB nodes 106a and 106b and two serving IAB nodes 106c and 106d. As used herein, the term "coupled" refers to direct or indirect and wired or wireless communications between two nodes or devices.

As shown in FIG. 1, serving IAB nodes 106c and 106d are directly coupled to UEs 108a and 108b, respectively, and function as the serving cell site base stations or access points for the UEs 108a and 108b. The UEs 108a and 108b are referred to herein as "access UEs." The serving IAB nodes 106c and 106d also function as relay and can forward their respective UE signals to their respective next uplink nodes in the transmission path, and forward downlink signals to their respective UEs 108a and 108b. As shown in FIG. 1, the serving IAB node 106c can forward uplink UE signals to one or both of the intermediate IAB nodes 106a and 106b, and receive downlink UE signals from one or both of the intermediate IAB nodes 106a and 106b. The intermediate IAB nodes 106a and 106b can forward uplink UE signals to the donor IAB node 104, and forward downlink signals to the serving IAB node 106d. The serving IAB node 106c can forward uplink UE signals to the donor IAB node 104, which can then forward all received signals to the core network 102, and can forward downlink signals from the donor IAB node 104 to the access UE 108a.

Each of the IAB nodes 106a-106d can have two functions: a base station (BS) function and a mobile terminal (MT) function. The BS function means the IAB node can work like a base station to provide the radio access function for a UE. As used herein, the "BS part" of an IAB node refers to that portion of the IAB node, including all hardware, firmware and/or software related to performing the BS functions of the IAB node. The MT function means the IAB node can work like a mobile terminal to be controlled and scheduled by the IAB donor node or an upper IAB node. As used herein the "MT part" of an IAB node refers to that portion of the IAB node, including all hardware, firmware and/or software related to performing the MT functions of the IAB node.

Referring still to FIG. 1, if the network 100 also implements a split architecture, the donor IAB node 104 would be replaced by a donor CU (not shown) connected to the core network 102 and a donor DU (not shown) connected to the donor CU. Each of the IAB nodes 106a-106d would be coupled to the donor DU in similar fashion to their coupling to the donor IAB node 104, as shown in FIG. 1.

In a split architecture network, each of the IAB nodes 106a-106d can have two functions: a DU function and a mobile terminal (MT) function. The DU function means the IAB node can work like a DU to provide the predetermined DU functions for a UE. As used herein, the "DU part" of an IAB node refers to that portion of the IAB node, including all hardware, firmware and/or software related to performing the DU functions of the IAB node. The MT function and MT part of an IAB node in a split architecture network is the same as described above for a non-split architecture network.

The implementation of the split architecture and the IAB architecture technologies in the 5G network will raise many challenges. One such challenge is that when establishing UE PDU data sessions, for example, a CU should be aware of the potential data forwarding path and then transmit a UE context setup/modify request message to a DU. However, when it comes to the IAB architecture, it is not clear how the bearer is established among the donor DU and intermediate IAB nodes. Furthermore, when it comes to the IAB network, additional latency components (e.g., the latency between intermediate IAB nodes) should be considered. It is necessary to design a new discard mechanism for IAB nodes to determine whether the relayed data packet should be discarded or not. Thus, current bearer management techniques are not entirely satisfactory to take into account emerging split architecture and/or IAB architecture networks.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first wireless communication node includes: transmitting a data radio bearer (DRB) setup request message to each of at least one second wireless communication node, wherein the DRB setup request message contains the identity of a plurality of DRBs and at least one of a Quality of Service (QoS) flow and a UE bearer mapped to each of the plurality of DRBs, respectively; receiving a DRB setup response from each of the at least one second wireless communication node, wherein each DRB setup response contains a first list of at least one of QoS flows and UE data bearers failed to be setup by a respective one of the at least one second wireless communication node and a second list of at least one of QoS flows and UE data bearers successfully setup by the respective one of the at least one second wireless communication node; based on each of the first and second lists, determining at least one DRB and at least one QoS flow mapped to the at least one DRB supported by each of the at least one second wireless communication node; and configuring each of the at least one second wireless communication node to support the at least one DRB and the at least one QoS flow/UE data bearer.

In a further embodiment, the invention provides a non-transitory computer-readable medium having stored thereon computer-executable instructions for carrying out the above method.

In another embodiment, a first wireless communication node, includes a transceiver configured to: transmit a data radio bearer (DRB) setup request message to each of at least one second wireless communication node, wherein the DRB setup request message contains the identity of a plurality of DRBs and at least one of a Quality of Service (QoS) flow and a User Equipment (UE) bearer mapped to each of the plurality of DRBs, respectively; and receive a DRB setup response from each of the at least one second wireless communication node, wherein each DRB setup response contains a first list of at least one of QoS flows and UE bearers that failed to be setup by a respective one of the at least one second wireless communication node and a second list of at least one of QoS flows and UE bearers that were successfully setup by the respective one of the at least one second wireless communication node; and at least one processor, coupled to the transceiver, wherein the at least one processor is configured to: based on each of the first and second lists, determine at least one DRB and at least one QoS flow mapped to the at least one DRB supported by each of the at least one second wireless communication node; and configure each of the at least one second wireless communication node to support the at least one DRB and the at least one QoS flow.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In a split architecture, IAB network, when a UE sets up its dedicated DRBs, the backhaul RLC channels or backhaul radio bearer should also be setup/modified on the IAB nodes along the forwarding data path toward the Donor IAB node. Exemplary embodiments of performing UE bearer and backhaul bearer management procedures are described herein.

Figure 1:
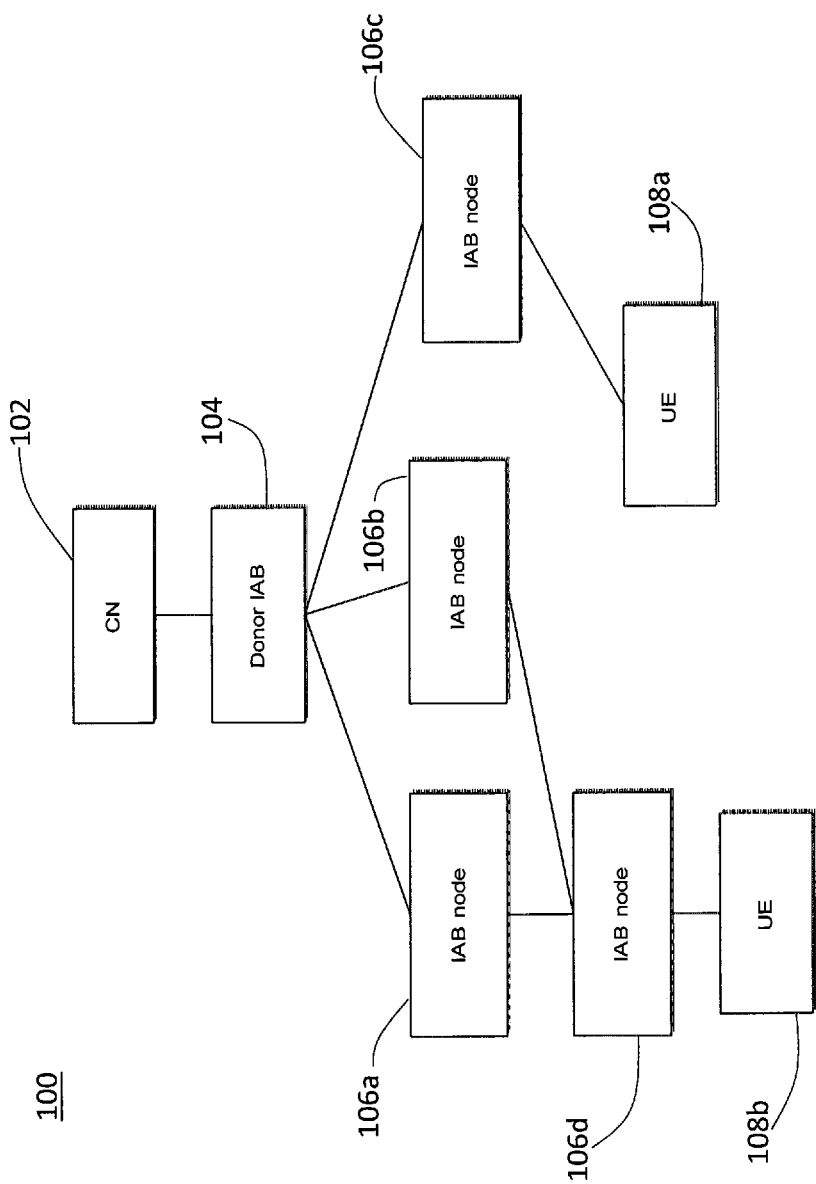
FIG. 1 illustrates a block diagram of an exemplary communication network in which techniques disclosed herein may be implemented, in accordance with some embodiments of the invention.
Figure 2:
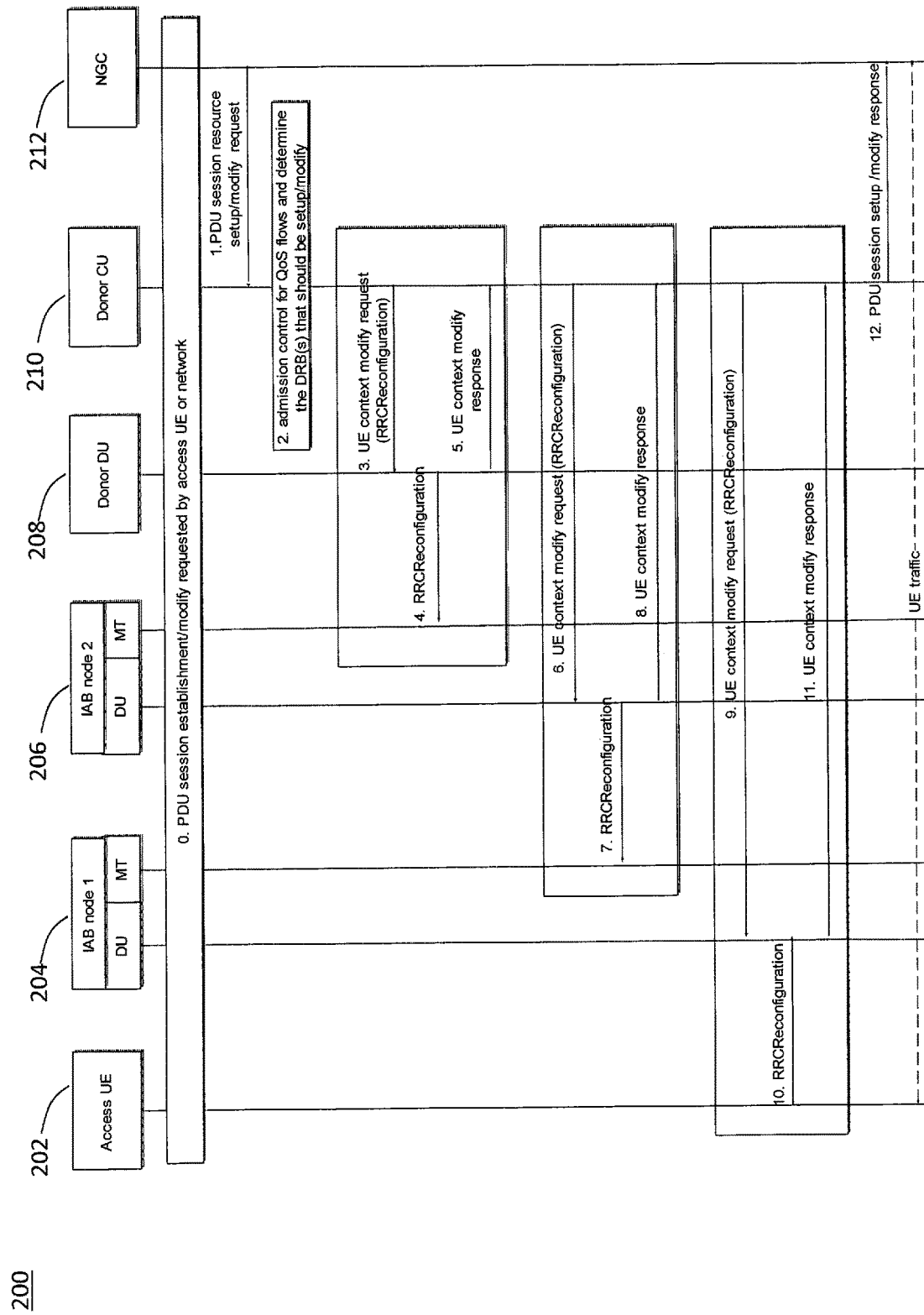
FIG. 2 illustrates a signaling diagram for a method of UE bearer management in a split architecture IAB network, in accordance with some embodiments of the invention.

FIG. 2 illustrates a signaling diagram for a method of UE bearer management 200 in a split architecture IAB network, in accordance with some embodiments of the invention. As shown in FIG. 2, an access UE 202 is coupled to a serving IAB node 204 (designated as "IAB node 1") having a DU part and an MT part. The MT part of IAB node 204 is served by a second IAB node 206 (designated as "IAB node 2") having a DU part and an MT part. The MT part of IAB node 206 is served by a donor DU 208, which is coupled to a donor CU 210 connected to a Next Generation Core Network (NGC) 212.

As shown in FIG. 2, the method begins at signaling step 0, wherein the UE 202 or NGC 212 initiates a PDU session establishment/modify request. At step 1, in order to setup new QoS flows to support the PDU session for the access UE 202, the NGC 212 sends a PDU session resource setup/modify request message to donor CU 210. At step 2, upon receiving the PDU session resource setup/modify request message, the donor CU 210 determines if resources are available for the requested configuration. If yes, the donor CU determines to establish one or more DRBs and associates each established or to-be-established DRB with an accepted QoS flow of the PDU session. Next at step 3, the donor CU 210 sends a UE context modify request (which contains Radio Resource Control (RRC) Reconfiguration) message to the donor DU 208, the message containing a DRB to be setup/modify/release list. In some embodiments, RRC Reconfiguration message is contained in the container of the UE context modify request message. In addition to the container, the UE context modify request message can also contain other fields, such as a SRB list, a DRB list to be setup/modify, radio resource configuration, Scell configuration, etc. In some embodiments, for each DRB to be setup or modified, it further contains a DRB id, one or more QoS flows/UE data bearers mapped to each DRB and QoS parameters for each QoS flow/UE data bearer mapped to each DRB. In accordance with various embodiments, the "DRB" refers the backhaul bearer used only for forwarding the UE's data packet. "UE data bearer" refers to the UE bearer associated with a PDU session whose data packet will be forwarded via the backhaul bearers.

In accordance with various embodiments, the donor CU 210 can be implemented as a next Generation Node B (gNB), an E-UTRAN Node B (eNB), a Transmission/Reception Point (TRP), an Access Point (AP), or other similar communication nodes known in the art or to be developed in the future. In one embodiment, the donor CU 210 is implemented as a gNB, and the UE context modify request message contains a gNB-CU UE F1AP ID and gNB-DU UE F1AP ID, which is related to the MT part of the IAB node 206.

At step 4, the donor DU 208 sends the corresponding RRCReconfiguration message to the MT part of the IAB node 204 via a signaling radio bearer. Upon receiving the RRCReconfiguration message, at step 5, the MT part of IAB node 206 performs the configuration, and sends back a RRCReconfigurationComplete message to the donor DU 208. After the donor DU 208 receives the RRCReconfigurationComplete message from the MT part of IAB node 206, the donor DU 208 sends a UE context modification response message to the donor CU 210. In some embodiments, the UE context modification response message contains a list of DRBs that are successfully established/modified and a list of DRBs that failed to be established/modified.

Steps 6-8 are similar to steps 3-5 described above, except the donor CU 210 communicates with the IAB node 206 to perform the UE context modification procedure with IAB node 206 in order to establish and/or modify the DRBs between the MT part of IAB node 204 and DU part of IAB node 206. Similarly, steps 9-11 are also similar to steps 3-5 described above, except the donor CU 210 communicates with the IAB node 204 to perform the UE context modification procedure with IAB node 204 in order to establish and/or modify the DRBs between the access UE 202 and DU part of IAB node 204.

Finally, at step 12, the donor CU 210 sends to the NGC 212 a PDU session resource setup/modify response message, which contains the results for each PDU session resource requested to be setup or modified. In some embodiments, the list of QoS flows which have been successfully established and/or failed to be established is included in the PDU session resource setup/modify response message.

As discussed above, the signaling procedure shown in FIG. 2 illustrates a successful UE bearer setup/modify procedure. In this procedure, the donor CU 210 is aware of the potential data forwarding path and then transmits the UE context setup/modify request message to the donor DU 208 as well as each DU part of intermediate IAB node 204 and 206 along the path. After that, the donor DU 208 and DU part of each intermediate IAB node 204 and 206 transmits the corresponding RRCReconfiguration message to MT part of a downstream IAB node or access UE, respectively. However, it is possible that not all the intermediate IAB nodes 204 and 206 could successfully establish/modify the DRBs requested by donor CU 210. For example, as discussed above, if the set of DRBs established at each intermediate IAB node 204 and 206 are different from each other, the DU part of intermediate IAB nodes 204 and 206 and the donor DU 208 may have different views about the QoS flows/UE bearers and/or DRBs established for forwarding data for a given UE bearer. As a specific example, the donor CU 210 may be requested to support QoS flow 1, QoS flow 2 and QoS flow 3 for a PDU session of access UE 202. According to donor CU 210, the QoS flow 1 and QoS flow 2 could be mapped to DRB 1 of the DU part of IAB node 204 and the donor DU 208, respectively. And QoS flow 3 is mapped to DRB 2 of the DU part of IAB node 204. On the other hand, the QoS flow 1 and QoS flow 2 could be mapped to DRB 3 of the DU part of IAB node 206 and QoS flow 3 is mapped to DRB 4 of the DU part of IAB node 206. Suppose the donor DU could accept all the QoS flows, however, the DU part of IAB node 204 could only accept QoS flow 1 mapped to DRB 2 whereas the DU part of IAB node 206 could accept QoS flow 1 mapped to DRB3 and QoS flow 3 mapped to DRB4. In this case, only QoS flow 1 can be supported by donor DU and all the intermediate IAB nodes.

In addition, as discussed above, in current designs, the UE context setup/modify response message only notifies the donor CU 210 of the list of DRBs that failed to be setup or modified. For different intermediate IAB nodes 204 and 206, the DRB ID used to associate the new QoS flows might be different, so the donor CU 210 may not be able to distinguish the exact QoS flow or DRB that could be not be supported by the intermediate IAB nodes 206 and serving IAB nodes 204. In order to address this problem, in accordance with various embodiments, the UE context setup/modify response message is reported to donor CU 210 in finer granularity. For example, in accordance with various embodiments, the UE context setup/modify response message contains additional information such as QoS flow information (QFI), an access UE ID, a UE bearer ID for QoS flows that failed to be setup and/or modified. In this way, the donor CU 210 can determine exactly which QoS flows could not be supported and then configure the DRBs accordingly.

Figure 3:
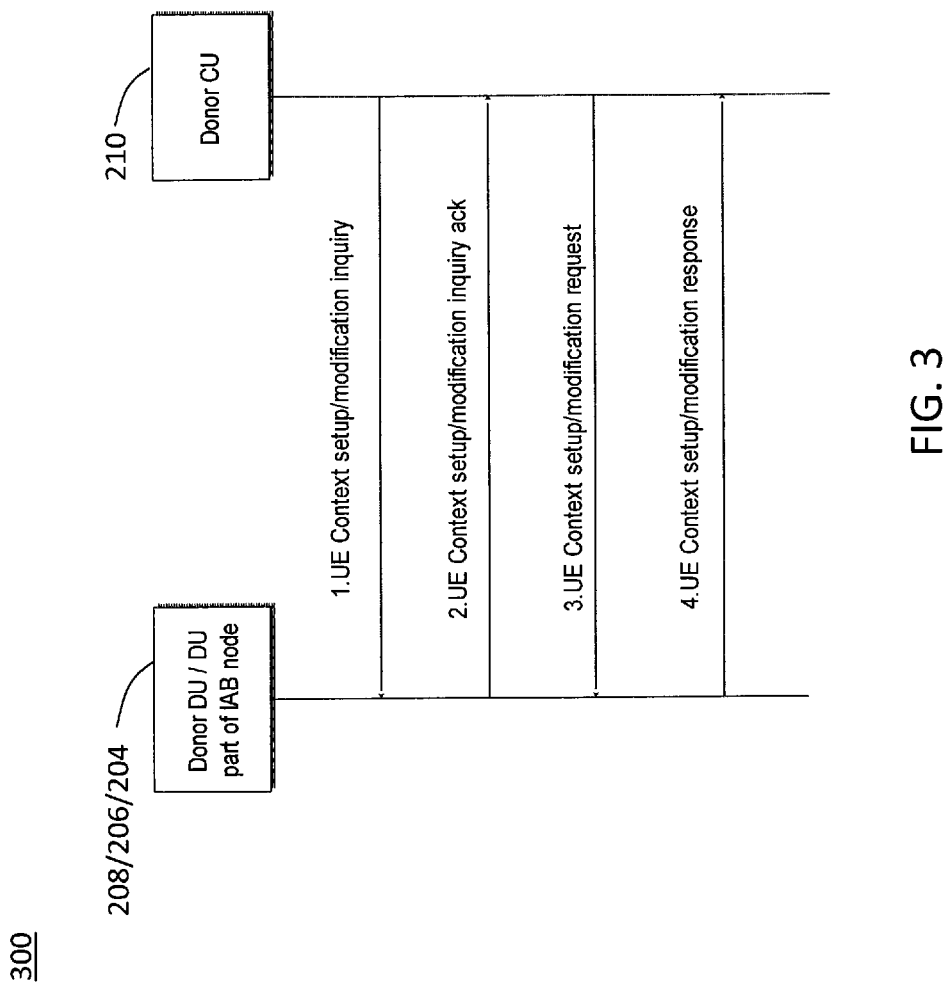
FIG. 3 illustrates a signaling diagram for a UE context setup/modification negotiation procedure between a donor CU, a donor DU and IAB nodes, in a split architecture IAB network, in accordance with some embodiments of the invention.

FIG. 3 illustrates a signaling diagram of a negotiation process 300 performed between a donor CU 210 and each of the donor DU 208, the intermediate IAB node 206 and the serving IAB node 204, in accordance with some embodiments. At step 1 of the negotiation process, the donor CU 210 sends a UE context setup/modification inquiry message to the donor DU 208 and each IAB node 204 and 206. In some embodiments, the UE context setup/modification inquiry message contains the DRBs that need to be setup or modified and the QoS flows/UE data bearers mapped to these DRBs. In some embodiments, for each QoS flow/UE data bearer mapped to each of the DRBs, it further contains the QoS parameters, the UE ID and or UE bearer ID. In yet further embodiments, the UE context setup/modification inquiry message further contains for each UE bearer, QoS parameters such as one or more of the following: a packet delay budget (PDB), a packet error rate (PER), a priority level, delay critical indication, an average window period, a maximum data burst volume, a guaranteed bit rate (GBR), QoS flow information (QFI), an uplink (UL) UE aggregated maximum flow bit rate (AMBR), a discard timer, etc. It should be noted the UE and UE bearer here denotes the access UE that has data packets to be forwarded by Donor DU 208 and or the intermediate/serving IAB nodes 206/204. As used herein, the term "UE context setup/modification inquiry message" refers to a type of "DRB setup request message" that can be used for bearer management in a split architecture networks.

Upon receiving the UE context setup/modification inquiry message, the donor DU 208 and each IAB node 204 and 206 check if the requested QoS flows and/or UE bearers and DRBs can be successfully setup and/or modified. Then, at step 2, the donor DU 208 and each IAB node 204 and 206 sends a UE context setup/modification inquiry acknowledgement (ACK) message to the donor CU 210. In accordance with some embodiments, this UE context setup/modification inquiry ACK message contains a list of QoS flows/UE data bearers and or DRBs that failed to be setup/modified, and a list of QoS flows and or DRBs that could be successfully setup/modified. In further embodiments, for each QoS flow contained in these lists, the ACK message further contains at least one of the following: QFI, a UE ID, a UE bearer and an IAB DRB ID. As used herein, the term "UE context setup/modification inquiry ACK message" refers to a type of "DRB setup response message" that can be used for bearer management in a split architecture networks.

Upon receiving the UE context setup/modification inquiry ACK message from all the IAB nodes 204 and 206 and the donor DU 210 along the data forwarding path of access UE 202, the donor CU 210 determines the DRBs and QoS flows/UE data bearers that could be successfully accepted by the donor DU 208 and all the IAB nodes 204 and 206 in the data forwarding path. It should be understood that although only two IAB nodes 204 and 206 are illustrated in FIG. 2, the invention can be implemented in a split architecture IAB network with any desired number of IAB nodes in the access UE data forwarding path.

Next, at step 3, the donor CU 210 sends a UE context setup/modification request message to the donor DU, which contains the DRBs that need to be setup or modified and the QoS flows/UE data bearer mapped to these DRBs. Compared with UE context setup/modification inquiry message, the UE context setup/modification request message only contains the DRBs and QoS flows/UE data bearer that might be accepted, as determined from the UE context setup/modification inquiry ACK message discussed above. In some embodiments, for each QoS flow/UE data bearer mapped to the DRBs, the UE context setup/modification request message contains the QoS parameters, the UE ID and/or the UE bearer ID. In some embodiments, the UE context setup/modification request message contains at least one of the following: UE ID and or UE bearer ID, QoS parameters for these UE bearers (e.g., PDB, PER, priority level, delay critical indication, average window, maximum data burst volume, GBR, QFI, etc.), UL UE AMBR, a discard timer, etc. It should be noted the UE and UE bearer here denotes the access UE that has data packet to be forwarded by Donor DU 208 and/or the IAB nodes 204 and 206. In further embodiments, the UE context setup/modification request message contains routing configuration information. In some embodiments, the routing configuration information may include the combination of at least one of the following fields: a routing index, a transmission direction, a destination ID, a next hop ID, number of hops, weights or benefits for each hop or path, a bearer ID, etc.

Upon receiving the UE context setup/modification request message, the donor DU 208 and each IAB node 204 and 206 performs the setup and modification of DRBs. Next at step 4, the donor DU 208 and each IAB node 204 and 206 sends a UE context setup/modification response message to the donor CU 210. In accordance with some embodiments, this response message contains a list of QoS flows and/or DRBs that have been successfully setup and/or modified.

In some embodiments, the RRCReconfiguration can be contained in the UE context setup/modification request message of step 3 discussed above. In some embodiments, this message can be further sent by the donor DU 208 or the DU part of IAB node 206 to the MT part of its downstream IAB node 204. This message contains the DRBs that need to be setup/modified/released at the MT part of the downstream IAB node. In addition, in some embodiments, this message might contain the UE bearer information. Here the UE denotes the access UE that has data packet to be forwarded by the donor DU 208 and IAB nodes 204 and 206. In some embodiments, the UE bearer info contains at least one of the following fields: the UE ID and/or UE bearer ID, QoS flows mapped to each of the DRBs and QoS parameters (such as PDB, PER, priority level, delay critical indication, PRB, bucket size duration, etc), a discard timer, etc. Additionally, in some embodiments, the RRCReconfiguration message may contain the routing configuration, which includes the combination of at least one of the following fields: a routing index, a transmission direction, a destination ID, a next hop ID, weights, benefits, number of hops, and a bearer ID.

Figure 4:
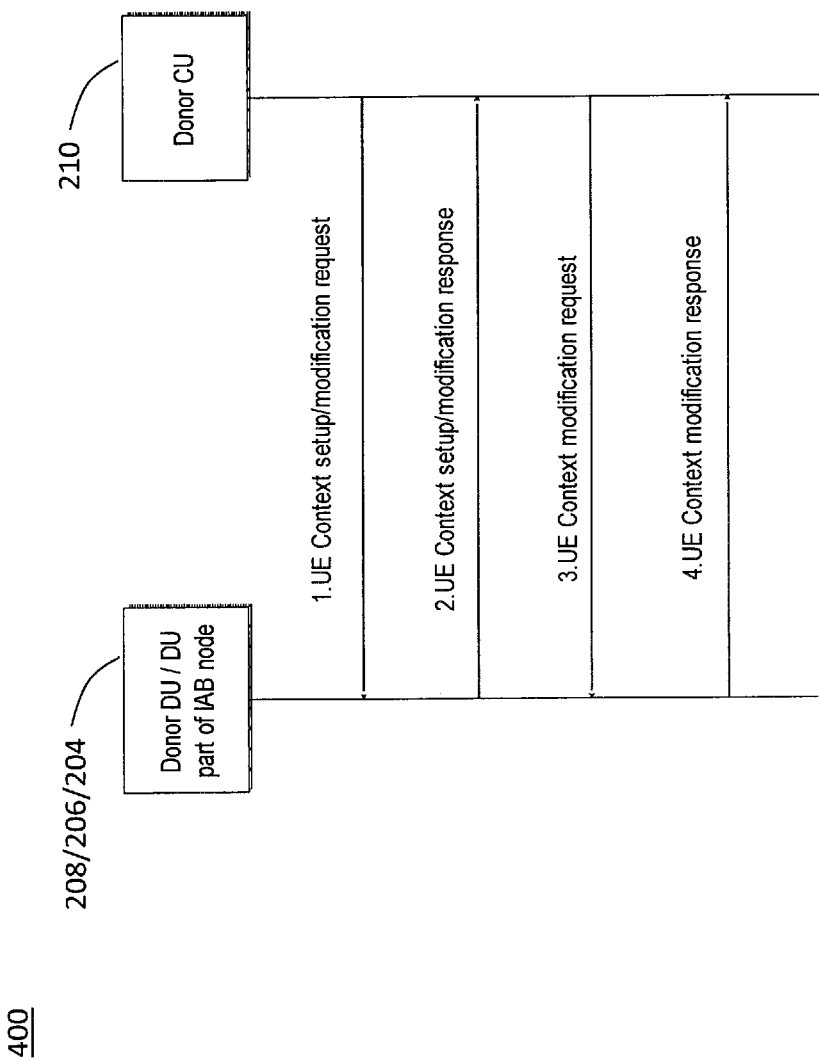
FIG. 4 illustrates a signaling diagram for UE context modification negotiation procedure between a donor CU, a donor DU and IAB nodes, in a split architecture IAB network, in accordance with some embodiments of the invention.

FIG. 4 illustrates a signaling diagram 400 for a method of UE context set up and modification, in accordance with another embodiment of the invention. After receiving the UE context setup/modification response message from each of the donor DU 208 and IAB nodes 204 and 206 as discussed above with respect to FIG. 3, if some of the requested DRB/QoS flows are not supported by one or more of the IAB nodes 204 and 206, the donor CU 210 can perform a UE context setup/modification procedure again with the one or more IAB nodes, as shown in FIG. 4.

As shown in FIG. 4, in step 1, the donor CU 210 sends a UE context setup/modification request message again to the donor DU 208 and each DU part of IAB node 204 and 206. As before, the UE context setup/modification request message contains the DRBs that need to be setup or modified and the QoS flows/UE data bearer mapped to these DRBs. In some embodiments, for each QoS flow/UE data bearer mapped to each of the DRBs, it further contains the QoS parameters, the UE id and or UE bearer id. In further embodiments, the UE context setup/modification request might further consists of the UE and UE bearers information, for example, at least one of the following: UE ID, UE bearer ID, QoS parameters associated with the UE bearers (PDB, PER, priority level, delay critical indication, average window, maximum data burst volume, GBR, QFI, etc.), UL UE AMBR, discard timer, an allowed subcarrier spacing (SCS) list, etc. It should be noted the UE denotes the access UE that has data packet to be forwarded by Donor DU and/or the downstream IAB nodes 204 and 206.

Upon receiving the UE context setup/modification request message, the donor DU 208 and each IAB node 204 and 206 check, respectively, if these QoS flows and DRBs could be successfully setup/modified and thereafter perform the setup and/or modification of DRBs. Then, at step 2, the donor DU 208 and each IAB node 204 and 206 sends the UE context setup/modification response message to the donor CU 210, respectively, which contains a list of QoS flows/UE data bearer and/or DRBs that failed to be setup/modified, and a list of QoS flows/UE data bearer and/or DRBs that could be successfully setup/modified. In some embodiments, for each QoS flow contained in these lists, the response message further contains the QFI, UE ID and/or UE bearer ID, and the IAB DRB ID.

Upon receiving the UE context setup/modification response message from all the IAB nodes 204 and 206, and donor DU 208, along the data forwarding path of the access UE, the donor CU 210 determines the DRBs and QoS flows that could be successfully accepted by the donor DU 208 and all the concerned IAB nodes 204 and 206. In further embodiments, the UE context setup/modification request message may contain routing configuration. The routing configuration may include the combination of at least one of the following field: a routing index, a transmission direction, a destination ID, a next hop LD, weights and/or benefits for each hop or path, number of hops, and a bearer ID. Then, at step 3, the donor CU 210 sends a UE context modification request message to the donor DU 208 and IAB nodes 204 and 206, which contains the DRBs that need to be modified or released according to the DRBs and QoS flows that could be successfully accepted by the donor DU 208 and all the concerned IAB nodes 204 and 206. In addition, the routing information might be reconfigured based on the updated DRB lists.

Upon receiving the UE context setup/modification request message, the donor DU 208 and each IAB node 204 and 206 performs the setup and modification of DRBs. Then, at step 4, the donor DU 208 and each IAB node 204 and 206 sends a UE context setup/modification response message to the donor CU 210, which contains a list of QoS flows/UE data bearers and/or DRBs that were successfully setup and/or modified.

In some embodiments, the RRCReconfiguration message (discussed above in connection with FIG. 2) can be contained in the UE context setup/modification request message. This RRCReconfiguration message could be further sent by the donor DU or a DU part of an intermediate IAB node to the MT part of its downstream IAB node. In some embodiments, this RRCReconfiguration message contains the DRBs/UE data bearer that need to be setup/modified/released at the MT part of the downstream IAB node. In addition, this RRCReconfiguration message might contain the UE bearer information. Here the UE denotes the access UE that has data packet to be forwarded by the donor DU and IAB nodes along the data path between the UE and donor CU. In some embodiments, the UE bearer info contains at least one of the following fields: the UE ID and or UE bearer ID, QoS flows mapped to the DRBs and QoS parameters (such as PDB, PER, priority level, delay critical indication, prioritized bit rate (PBR), bucket size duration, etc.), a discard timer, etc. Additionally, in some embodiments, the RRCReconfiguration message may contain the routing configuration, which includes at least one of the following fields: a routing index, a transmission direction, destination ID, next hop ID, weights and/or benefits of a hop or path, number of hops and bearer IDs.

For each of the embodiments discussed above in connection with FIGS. 3 and 4, it should be noted that the UE bearer ID might be the UL UP TEID, DL UP TED, DRB ID, LCD, or a combination of UE ID and DRB ID/LCID. The UE ID might be a gNB-DU UE F1APID, a gNB-CU UE F1APID, a C-RNTI, a STMSI, a IMSI or a UE ID assigned by donor CU 210. For the routing configuration, the destination ID might be DU ID, UE ID or UE bearer ID. For the MT part of IAB node, it might be configured with one or several data radio bearers associated with a PDU session. These DRBs should be associated with complete Service Data Adaptation Protocol (SDAP), PDCP and RLC configuration information and can be used to deliver the data traffic originated by the MT part of an IAB node, such as operations, administration and maintenance (OAM) data. On the other hand, in some embodiments, the MT part of IAB node might be configured with one or more backhaul RLC bearers not associated with the PDU session. In some embodiments, these backhaul RLC bearers can be associated with adapt layer, RLC and MAC configurations and are only used for the user plane data forwarding.

For the donor DU and DU part of IAB nodes, it should be configured with DRBs and mapped QoS flow/UE data bearer parameters. In some embodiments, the DU part of an IAB node can derive the potential MAC/RLC configuration based on the CU-to-DU RRC information as well as the DRB and QoS parameter configuration. As is known, for each PDU session in the PDU session resource setup/modify request message, the NG-RAN node (e.g., a CU or donor IAB node) shall enforce the traffic corresponding to the received PDU Session Resource Aggregate Maximum Bit Rate information element (IE). The NG-RAN node shall use the received Aggregate Maximum Bit Rate for the concerned PDU session and concerned UE as specified in TS 23.501. For each UE, the NG-RAN establishes one or more Data Radio Bearers (DRB) per PDU Session (at least one default DRB). The NG-RAN maps packets belonging to different PDU sessions to different DRBs.

Since the backhaul RLC bearer is not associated with the PDU session, it would be better to setup backhaul RLC bearers separate from normal DRBs since mixing the UE bearers with RLC bearers would make it difficult for the DU to determine whether the AMBR for the PDU session is exceeded or not. Note that the backhaul RLC bearer is not necessarily associated with the DRB ID. Thus, in some embodiments, during the backhaul RLC bearer setup/modify procedure, an adapt configuration process can be setup or modified as well. In some embodiments, the adapt configuration can be associated with each backhaul RLC bearer. In some embodiments, the adapt configuration contains the routing and bearer mapping information. More specifically, the DU part and MT part of an IAB node can be configured differently as described below.

The DU part of an IAB node or donor DU: the adapt configuration can be used for the routing and backhaul RLC bearer mapping information for downlink data packets. The adapt configuration information can be delivered to the DU part via an F1-U interface. The adapt configuration associated with each backhaul RLC bearer contains the list of QFI/DSCP/5QI/UE bearer ID that could be mapped to this backhaul RLC bearer. In addition, the DU ID of a child IAB node's DU part and C-RNTI of the child IAB node's MT part mapping could be configured by a donor CU to the IAB node or donor DU.

The MT part of an IAB node: the adapt configuration can be used for the routing and backhaul RLC bearer mapping information for uplink data packets. It can be delivered to the MT part via a Uu interface. For the MT part of IAB node, the adapt configuration associated with each backhaul RLC bearer contains the list of QFI/DSCP/5QI/UE bearer ID that could be mapped to this backhaul RLC bearer.

Donor DU: In the uplink, the donor DU should be configured by donor CU with the UE bearer ID-F1 UL TNL information. The F1 UL TNL information can be configured via the UE context setup/modify procedure which delivers not only the F1 UL TNL information of the DRB for the MT part of IAB node served by donor DU but also the F1 UL TNL of the DRBs for all the access UEs directly or indirectly forwarded by the donor DU. For the downlink, the donor DU can be configured by the donor CU with the F1 DL TNL information—UE bearer ID mapping. In further embodiments, the donor DU can be configured by the donor CU with UE bearer ID—destination DU ID mapping.

It should be noted that above analysis is based on the assumption that the donor CU has full knowledge of the IAB topology and the data forwarding path for a given access UE. If the donor CU does not know IAB topology knowledge, however, it cannot directly request the DU part of IAB node to setup the backhaul RLC bearer. In this case, it may be necessary to consider a backhaul RLC bearer setup/modify procedure initiated by the MT part of IAB node, similar to the procedure discussed in further detail below in connection with FIG. 6.

Figure 5:
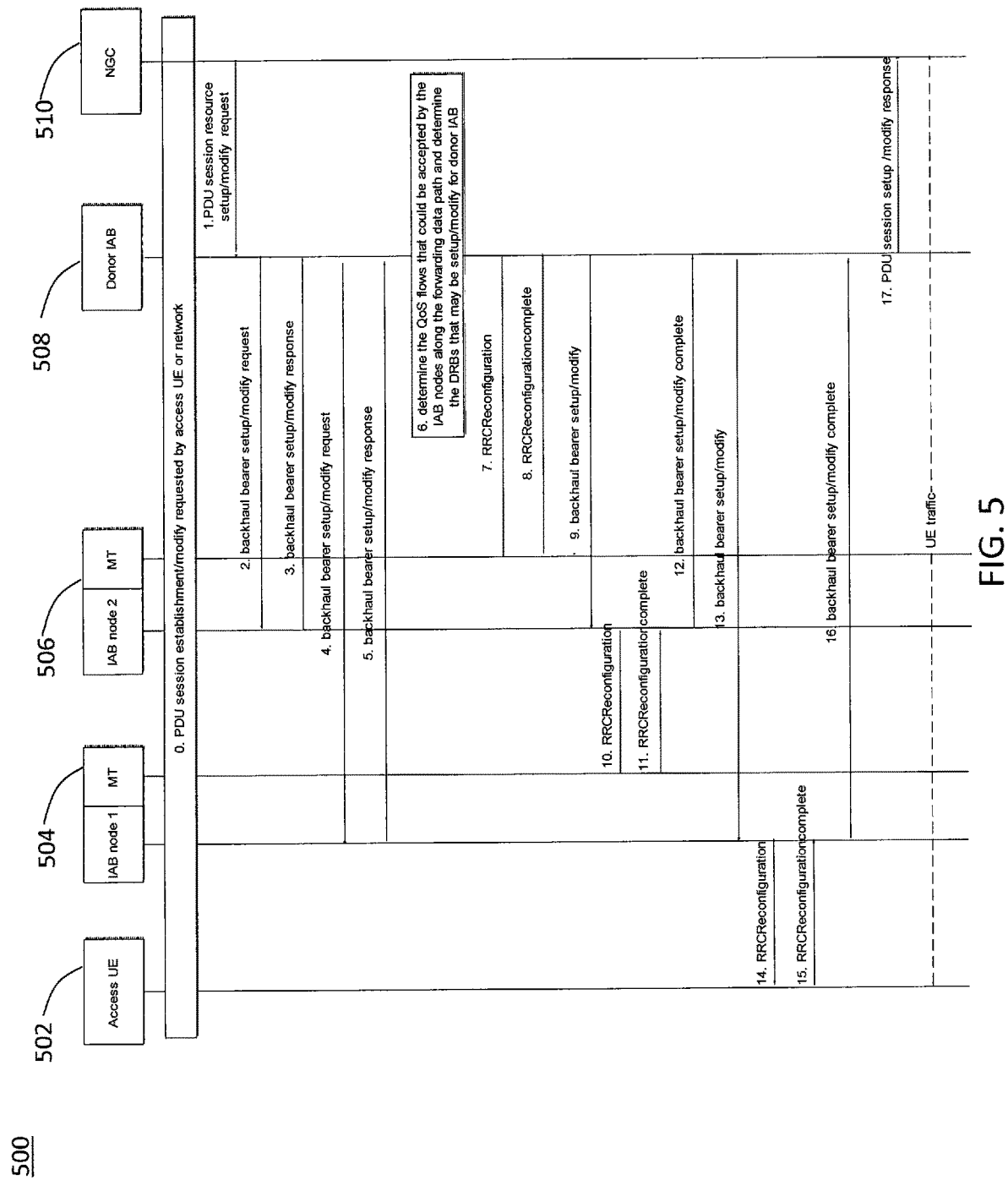
FIG. 5 illustrates a signaling diagram for a method of backhaul bearer management in a non-split architecture IAB network, in accordance with some embodiments of the invention.

FIG. 5 illustrates a signaling diagram for a method of backhaul bearer management in a non-split IAB network 500, in accordance with some embodiments. The non-split IAB network 500 includes an access UE 502 coupled to a serving IAB node 504, the MT part of the serving IAB node 504 is served by intermediate IAB node 506, and the MT part of IAB node 506 is served by a donor IAB node 508, which is connected to the NGC 510.

As shown in FIG. 5, at step 0, the UE 502 or NGC 510 initiates a PDU session establishment/modify request. Since a set of new QoS flows need to be supported for the access UE 502, at step 1, the NGC 510 sends a PDU session resource setup/modify request message to the donor IAB node 508. Upon receiving the PDU session resource setup/ modify request message, the donor IAB node 508 determines if resources are available for the requested configuration from the perspective of the donor IAB node 508. Meanwhile, the donor IAB node 508 can determine the data forwarding path for the access UE 502 and all the IAB nodes 504 and 506 along the data path. Then the donor IAB node sends a backhaul bearer setup/modify request message to each of the concerned IAB nodes (steps 2 and 4), which contains a list of backhaul bearers to be setup, modified or released, and/or a list of QoS flow/UE data bearer to be supported. As used herein, the term "backhaul bearer setup/ modify request message" refers to a type of "DRB setup request message" that can be used for bearer management in IAB architecture networks. In accordance with various embodiments, the term "DRB setup request message" can generally refer to a message for establishing, modifying or releasing backhaul RLC bearers, backhaul DRBs and UE DRBs.

For each backhaul bearer to be setup or modified, it may also contain the QoS parameters associated with each QoS flow/UE data bearer mapped to each backhaul bearer. In further embodiments, the backhaul bearer setup/modify/ release request message may contain the access UE and UE bearer info associated with each QoS flow, for example, at least one of the following info: UE ID and/or UE bearer ID, QoS parameters for these UE bearers (PDB, PER, priority level, delay critical indication, average window, maximum data burst volume, GBR, QFI), UL UE AMBR, discard timer, allowedSCSlist, etc. It should be noted the UE above denotes the access UE that has data packets to be forwarded by Donor IAB and/or the intermediate IAB nodes.

Upon receiving the backhaul bearer setup/modify request message, each of IAB nodes determines if resources are available for the requested configuration and then sends the bearer setup/modify response message to the donor IAB 508 (steps 3 and 5), which contains the list of backhaul bearers/ QoS flows/UE data bearers that failed to be setup/modified, and/or list of QoS flows/UE data bearer and or DRBs that could be successfully setup/modified. In some embodiments, for each QoS flow contained in these lists, it further contains the QFI, UE ID and/or UE bearer ID. As used herein, the term "backhaul bearer setup/modify response message" refers to a type of "DRB setup response message" that can be used for bearer management in IAB architecture networks. In accordance with various embodiments, the term "DRB setup response message" can generally refer to a message for listing backhaul RLC bearers, backhaul DRBs and UE DRBs that failed to be setup/modified and/or that were successfully setup/modified.

Upon receiving the bearer setup/modify response message from each the intermediate IAB nodes 504 and 506 along the data forwarding path of access UE 502, at step 6, the donor IAB node 508 determines the DRBs and QoS flows/UE bearer that could be successfully accepted by donor IAB node 508 and all the concerned intermediate IAB nodes 504 and 506. Thereafter, the donor IAB determines to establish one or several DRBs and associates each accepted QoS flow/UE data bearer to an established DRB or to be established DRB. Then, at step 7, the donor IAB 508 sends a RRCReconfiguration message to the MT part of IAB node 506, which contains the DRB to be setup/modify/release list. In some embodiments, for each DRB to be setup/modify, it further contains the DRB id, DRB QoS and QoS parameter of each QoS flow/UE data bearer mapped to this DRB. In addition, this RRCReconfiguration message might contain the UE bearer information. Here the UE denotes the access UE that has data packet to be forwarded by the donor IAB and intermediate IAB node along the data path between UE and donor IAB. More specifically, in some embodiments, the UE bearer info contains at least one of the following fields: the UE id and or UE bearer id, QoS flow mapped to the DRBs and QoS parameters (such as PDB, PER, priority level, delay critical indication, PBR, bucket size duration, etc), discard timer, PBR, bucket size duration, etc. Additionally, the RRCReconfiguration may contain the routing configuration, which includes at least one of the following fields: routing index, direction, destination id, next hop id, weights, benefits, number of hops, bearer id, etc. Upon receiving the RRCReconfiguration message, the MT part of IAB node 2 performs the configuration, and send back RRCReconfigurationComplete message to donor IAB (step 8).

In steps 9-16, the donor IAB 508 further sends backhaul bearer setup/modify messages to each of IAB node 504 and IAB node 506, which contains the backhaul bearer to be setup/modify/release list and or a list of QoS flow/UE data bearer to be supported. For each backhaul bearer to be setup/modified, the backhaul bearer setup/modify message may also contain the QoS parameters for each QoS flow/UE data bearer. Additionally, it may contain the access UE and UE bearer information associated with each QoS flow. Upon receiving the backhaul bearer setup/modify message, IAB node 504 and IAB node 506 performs corresponding bearer setup/modify operations (e.g., establishing or releasing DRBs, changing QoS parameters, etc.). On the other hand, the IAB node 506 and IAB node 504 may send the RRCReconfiguration message to the MT part of IAB node 504 and the access UE 502, respectively, which contains the DRB to be setup/modified/released list (steps 10 and 14). For each DRB to be setup/modified, it further contains the QoS flow/UE data bearer ID and/or QoS flow/UE data bearer's QoS parameters. Additionally, in some embodiments, this RRCReconfiguration message can contain the UE bearer information. Here the UE denotes the access UE that has data packet to be forwarded by the donor IAB and intermediate IAB nodes along the data path between UE 502 and donor IAB 508. In some embodiments, the UE bearer information contains the UE ID and or UE bearer ID, QoS flow(s) mapped to UE bearer and QoS parameters (such as PDB, PER, priority level, delay critical indication, PBR, bucket size duration, etc.), a discard timer, PBR, bucket size duration, etc. Additionally, the RRCReconfiguration may contain the routing configuration, which includes at least one of the following field: routing index, direction, destination id, next hop id, weights/benefits/hops, and bearer ID. Upon receiving the RRCReconfiguration message, the MT part of IAB node 504 performs the configuration, and sends back RRCReconfigurationComplete message to the IAB node 506 (step 11). Upon receiving the RRCReconfiguration message, the access UE performs the configuration, and sends back a RRCReconfigurationComplete message to the serving IAB node 504 (step 15). Upon receive the RRCReconfigurationComplete message, the IAB node 504 and IAB node 506 send a backhaul bearer setup/modify/release complete message to the donor IAB node 508 (steps 12 and 16).

Finally, at step 17, the donor IAB node 508 reports to the NGC 510 a PDU session resource setup/modify response message, which contains the result for each PDU session resource requested to be setup/modified. More specifically, it contains a list of QoS flows which have been successfully established and/or failed to be established.

Figure 6:
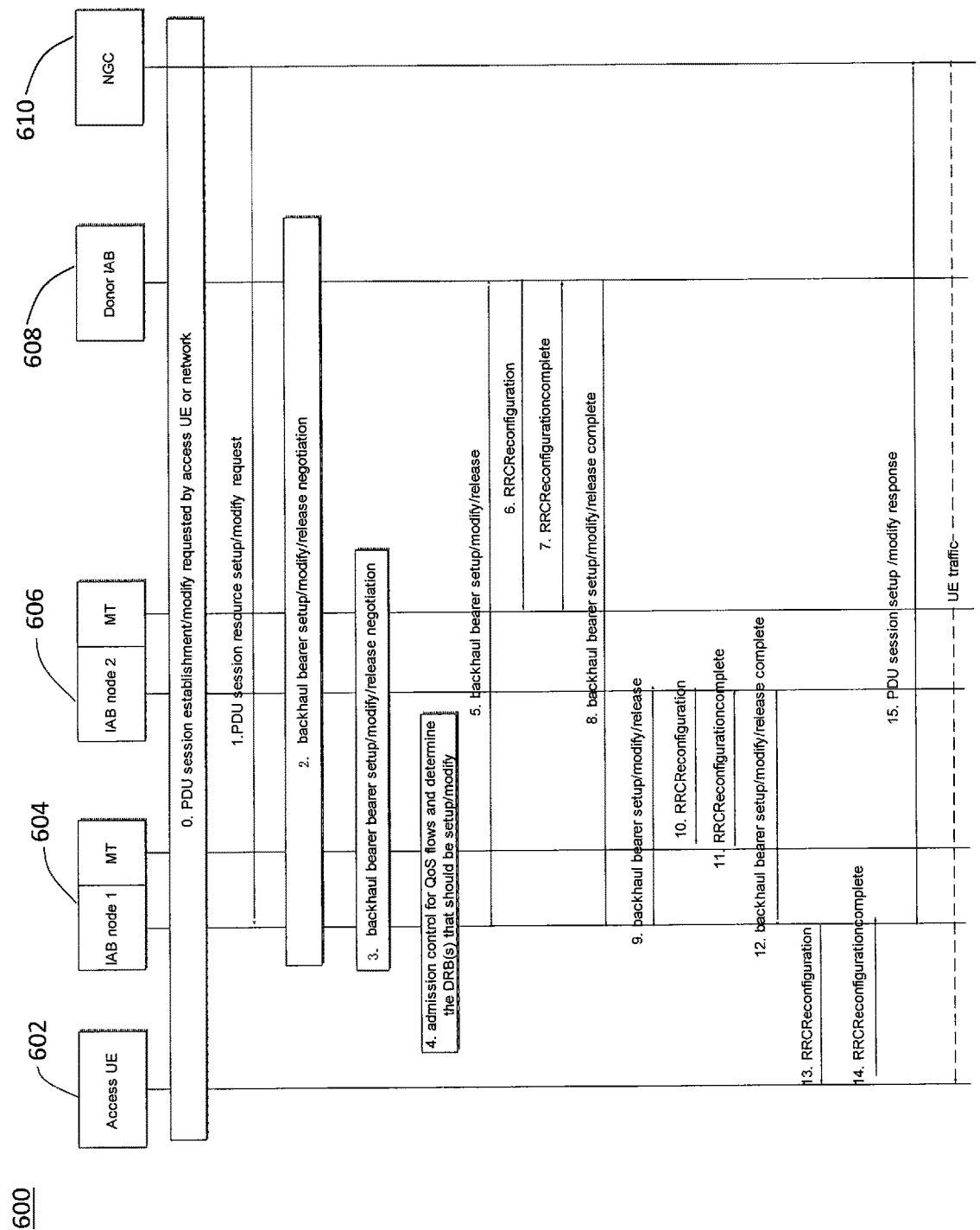
FIG. 6 illustrates a signaling diagram for a method of backhaul bearer management in a non-split architecture IAB network, in accordance with some alternative embodiments of the invention.

FIG. 6 illustrates a signaling diagram for a method for a UE bearer setup/modify/release procedure in an IAB network 600, in accordance with an alternative embodiment of the invention. The IAB network 600 includes an access UE 602 coupled to a serving IAB node 604, the MT part of the serving IAB node 604 is served by intermediate IAB node 606, and the MT part of IAB node 606 is served by a donor IAB node 608, which is connected to the NGC 610. In this embodiment, the serving IAB node 604 negotiates with each intermediate IAB node 606 and the donor IAB node 608 along the data forwarding path for the bearer setup/modify/release procedure.

As shown in FIG. 6, at step 0, a PDU session establishment/modify request is initiated by either the access UE 602 or the NGC 610. Next, at step 1, the NGC 610 sends a PDU session resource setup/modify request message to the serving IAB node 604 of access UE 602. Then, at steps 2 and 3, the serving IAB node negotiates with the upstream IAB node 606 and the donor IAB node 508, respectively, to obtain the backhaul bearer setup/modify responses from each of the upstream nodes 506 and 508. The signaling in the negotiation steps 2 and 3 of FIG. 6, can be similar to the steps 2-5 of FIG. 5 discussed above. The remaining steps 4-15 of FIG. 6 can be similar to steps 6-17 of FIG. 5 discussed above, except transmission directions may be changed since the serving IAB node 604 is initiating the negotiations and subsequent process steps. In accordance with various embodiments, the signaling exchange between IAB nodes and between IAB nodes and the donor IAB nodes can be based on Xn, X2, NG, F1, or Uu interface.

Figure 7:
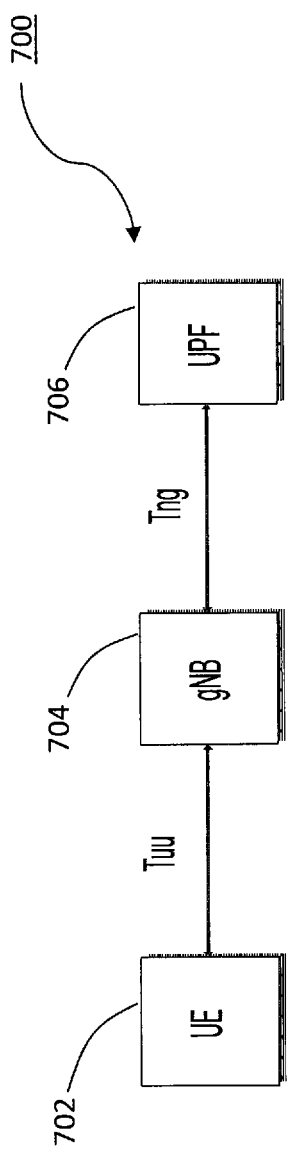
FIG. 7 illustrates latencies between a UE and User Plane Function (UPF) considered when configuring a discard timer, in accordance with some embodiments of the invention.

FIG. 7 illustrates a block diagram 700 of a network transmission path and corresponding latencies to be considered when performing latency aware packet discarding and routing, in accordance with some embodiments. Each QoS flow is associated with a 5G QoS Indicator (5QI) value which defines the Packet Delay Budget (PDB). The PDB defines the upper bound for the time that a packet may be delayed between the UE 702 and the User Plane Function (UPF) 706. The PDB is used to support the configuration of scheduling and link layer functions (e.g. the setting of scheduling priority weights and HARQ target operating points). For delay critical GBR QoS flows, a packet delayed more than PDB is counted as lost if the transmitted data burst is less than a Maximum Data Burst Volume (MDBV) within the period of PDB, and the QoS flow does not exceed the guaranteed flow bit rate (GFBR).

As shown in FIG. 7, the PDB corresponding to a data packet includes the latency components of Tuu and Tng. As used herein, for UL transmission, Tuu denotes the time duration between when a UE 702 receives the data packet from an upper layer and when the UE 702 successfully sends out the data packet to a serving gNB 704.

For DL transmission, it denotes the time duration between when a gNB 704 receives the data packet and the gNB 704 successfully sends out the data packet to the UE 702. For UL transmission, Tng denotes the time duration between when a gNB 704 receives a data packet and the gNB successfully sends out the data packet to the UPF 706. For DL transmission, Tng denotes the time duration between when the UPF receives the data packet and UPF successfully sends out the data packet to the gNB 704. It should be understood that the gNB 704 of FIG. 7 can be replaced with other types of nodes such an IAB node or a donor CU, for example.

According to current LTE/5G specifications, the UL Tuu requirement is reflected via the PDCP discardTimer associated with each UE bearer. At reception of a PDCP service data unit (SDU) from upper layers, the transmitting PDCP entity shall start the discardTimer associated with this PDCP SDU. When the discardTimer expires for a PDCP SDU, the transmitting PDCP entity shall discard the PDCP SDU along with the corresponding PDCP Data PDU. If the corresponding PDCP packet data unit (PDU) has already been submitted to lower layers, the discard is indicated to lower layers. With regard to the latency of Tng, no explicit indication is found in the current specifications. However, it could be taken into account by gNB implementations. For example, a gNB might estimate the Tng based on implementation and then configure the discardTimer with a value that is lower than (PDB−Tng). In this way, the PDB of a UL data packet transmission might be guaranteed, otherwise, it is discarded by UE, in accordance with some embodiments.

Figure 8:
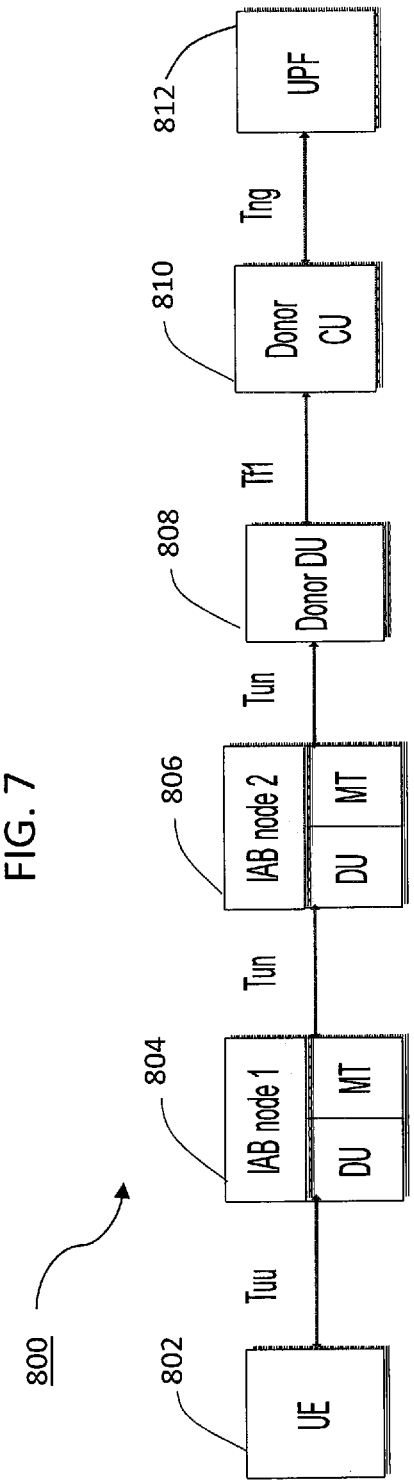
FIG. 8 illustrates latencies between a UE and UPF in a split architecture IAB network considered when configuring a discard timer, in accordance with some embodiments of the invention.

FIG. 8 illustrates a block diagram of a split-architecture IAB network 800, and associated latencies, to be considered when performing latency aware packet discarding and routing, in accordance with some embodiments. When it comes to the IAB network 800, additional latency components should be considered. As shown in FIG. 8, in addition to the latency components Tuu (between UE 802 and IAB 804) and Tng (between donor CU 810 and UPF 812) discussed above, latency components such as Tun and Tfl should also be considered. The Tun denotes respective latency between intermediate IAB nodes 804 and 806 a donor DU 808, whereas Tfl denotes the latency between the donor DU 808 and a donor CU 810.

More specifically, for UL transmission, Tfl denotes the time duration between when the donor DU 808 receives a data packet and the donor DU 808 successfully sends out the data packet to donor CU 810. For DL transmission, Tfl denotes the time duration between when the donor CU 810 receives the data packet and the donor CU 810 sends out the data packet to donor DU 808. For UL transmissions, Tun denotes the time duration between when a child IAB node receives the data packet and the child IAB node successfully sends out the data packet to a parent IAB node/donor DU. For DL transmissions, it denotes the time duration between when a parent IAB node/donor DU receives the data packet and the parent IAB node/donor DU successfully sends out the data packet to a child IAB node.

Thus, as described above, the latency components, Tuu, Tng, Tfl refer to the time spent on Uu (between UE and gNB/DU), NG (between UPF and gNB/CU) and F1 (between CU and DU) interfaces, respectively. In a Release 10 relay, the interface between the MT part of relay and a donor relay is called Un, so here we use Tun to refer to the time spent between the MT part of an IAB node and a parent IAB node. Similar to Tng, the latency of Tfl is typically over a wireline transmission and could be derived based on donor CU's implementation. When donor CU performs the PDCP discardTimer configuration for a UE's UL transmission, it might derive the discardTimer value by removing the latency component part of Tng and Tfl from the PDB associated with the UE bearer, in accordance with some embodiments. With UL transmission as an example, a UE's transmission of a PDCP entity shall start the discardTimer associated with this PDCP SDU upon reception of the PDCP SDU from an upper layer. When the discardTimer expires for a PDCP SDU, the transmitting PDCP entity shall discard the PDCP SDU if it has not yet been transmitted to a serving IAB node 804. Suppose the serving IAB node 804 receives the data packet from the UE 802 and schedules to transmit it to IAB node 806, then it needs to further determine whether the PDB of the data packet can still be guaranteed or not. For a split architecture IAB network, the intermediate IAB node does not support PDCP processing for relayed data packets. Thus, the PDCP based approach is no longer available.

To support the discard mechanism, a first serving IAB node 1 can determine the PDB headroom of a UE's data packet. With the UL transmission as an example, the serving IAB node 1 can start a discard timer associated with each data packet received from the UE which is set to the PDB headroom value. Suppose the data packet has not been successfully transmitted to a second IAB node 904 when the discardTimer expires, the transmitting RLC/Adapt entity shall discard the data packet. If the data packet arrives at an intermediate IAB node 2, the IAB node 2 should know the remaining PDB headroom. Then the IAB node 2 can continue to check whether the PDB headroom could be ensured. In this way, the packet discard check can be performed all the way along the data forwarding path until the UL data packet arrives at the donor DU. The PDB headroom used for packet discard is updated by every intermediate IAB node, which decrease the timer by the time the packet spends at the node.

On the other hand, for the DL transmission, the donor DU and all the intermediate IAB nodes along the data forwarding path should be aware of the PDB headroom. For the donor DU, it might directly receive the discard time configuration from the donor CU. For the intermediate IAB node, the PDB headroom might be obtained using one or more of the techniques described below.

In one embodiment, the PDB headroom can be based on the hop count of the transmission path. This approach assumes that latency is proportional to the number of hops in the path. So the PDB headroom could be determined by (Tdiscard−Telaps*Nhop). If the PDB headroom is larger than 0, it means that the PDB could be guaranteed, otherwise, the packet might be discard at an intermediate IAB node along the data forwarding path. The same per hop latency is assumed in this solution. However, it may happen that some backhaul links are congested while others are not, which may lead to different latencies per hop. Additionally, the data packets with different priorities might get different scheduling treatment, which also result in different latencies. Therefore, in further embodiments, other factors are considered in addition to only the hop count for latency estimation.

In another embodiment, the PDB headroom can be derived based on the PDB headroom information provided by an adapt layer protocol that can be implemented as a function performed by the UE, for example. For example, a UE can be enhanced to support the Tuu estimation and then report it to serving IAB node. In some embodiments, the PDB headroom can be assumed to be roughly equal to the (Tdiscard−Telaps), where the Tdiscard is the PDCP discardTimer value in ms whereas Telaps is the time duration between when the PDCP discardTimer is started and when the associated PDCP SDU is transmitted. In some alternative embodiments, the serving IAB node may derive the Telaps based on its downlink Uu transmission latency estimation. Meanwhile, the DU part of the serving IAB node should be able to get the discard time configuration of a UE bearer from the donor CU. Then the serving IAB node can calculate the remaining PDB headroom. Then the serving IAB node sets the discard timer with the same value of the remaining PDB headroom. The serving IAB node can discard the data packet if the discard timer expires. When the serving IAB node transmits the data packet to an upstream IAB node, it can update and include the remaining PDB headroom in the adapt subheader or a MAC subheader. Upon receiving the data packet, the upstream IAB node may further determine if the packet should be discarded based on the remaining PDB headroom.

For the DL, the donor DU should be aware of the discard timer configuration of the DRB/UE bearer from the donor CU. Upon receiving the data packet from donor CU, the donor DU can start the discard timer. Once the discard timer expires, the donor DU shall discard this data packet. Otherwise, the donor DU calculates the remaining PDB headroom with the approach described above and then include the remaining PDB headroom information in the adapt subheader or MAC subheader. When the data packet is continuously forwarded along the data path towards serving IAB node, the remaining PDB headroom is updated and the discard timer is started to check if the PDB can be guaranteed or not.

In a further embodiment, the PDB headroom can be derived based on timestamp information provided by the adapt subheader. In this embodiment, it assumes that all the UE and IAB nodes are synchronized and maintain the same timing. For UL, the serving IAB node may derive the Tuu based on the report from UE or based on its downlink Uu transmission latency estimation. Suppose the serving IAB node 1 receives the data packet at t1, the transmission start time of the data packet might be at (t1−Tuu). On the other hand, the serving IAB node 1 could determine the PDB associated with this DRB/UE bearer/QoS flow. Then the serving IAB node 1 could determine whether the time elapsed since the data packet is transmitted from UE exceeds PDB or not. If yes, this data packet would be discarded. Otherwise, the serving IAB node 1 could include the transmission start time of the data packet as the timestamp in the adapt subheader/MAC subheader.

Subsequently, the serving IAB node 1 transmit the data packet to IAB node 2. Upon receiving the data packet, IAB node 2 may get the timestamp information included in adapt subheader/MAC subheader as well as the DRB/UE bearer info. Then the IAB node 2 checks if the packet should be discarded based on the timestamp information and the PDB associated with this DRB/UE bearer. This discard check is performed on each intermediate IAB node until the data packet arrives at the donor DU.

For the DL, the donor DU receives the discard timer configuration of the DRB/UE bearer from the donor CU. Upon receiving the data packet from donor CU, the donor DU starts the discard timer. Once the discard timer expires, the donor DU shall discard this data packet. Suppose the donor DU receives the data packet at t1, the donor DU can derive the packet transmission start time by (t1−(PDB−discard timer)), where PDB is the packet delay budget associated with the DRB/UE bearer of this data packet. Further, in some embodiments, the donor DU may include the estimated packet transmission start time as a timestamp in the adapt subheader or MAC subheader and transmit it to IAB node 2. Suppose the IAB node 2 receives the packet at t2, IAB node 2 could use the timestamp to determine the remaining PDB by (t2−timestamp). IAB node 2 could use the remaining PDB to set the discard timer and detect whether the data packet should be discard or not. If not, the data packet is continuously forwarded along the data path towards serving IAB node 1. Each intermediate IAB node uses a similar mechanism as IAB node 2 to check if the PDB could be guaranteed or not.

Figure 9:
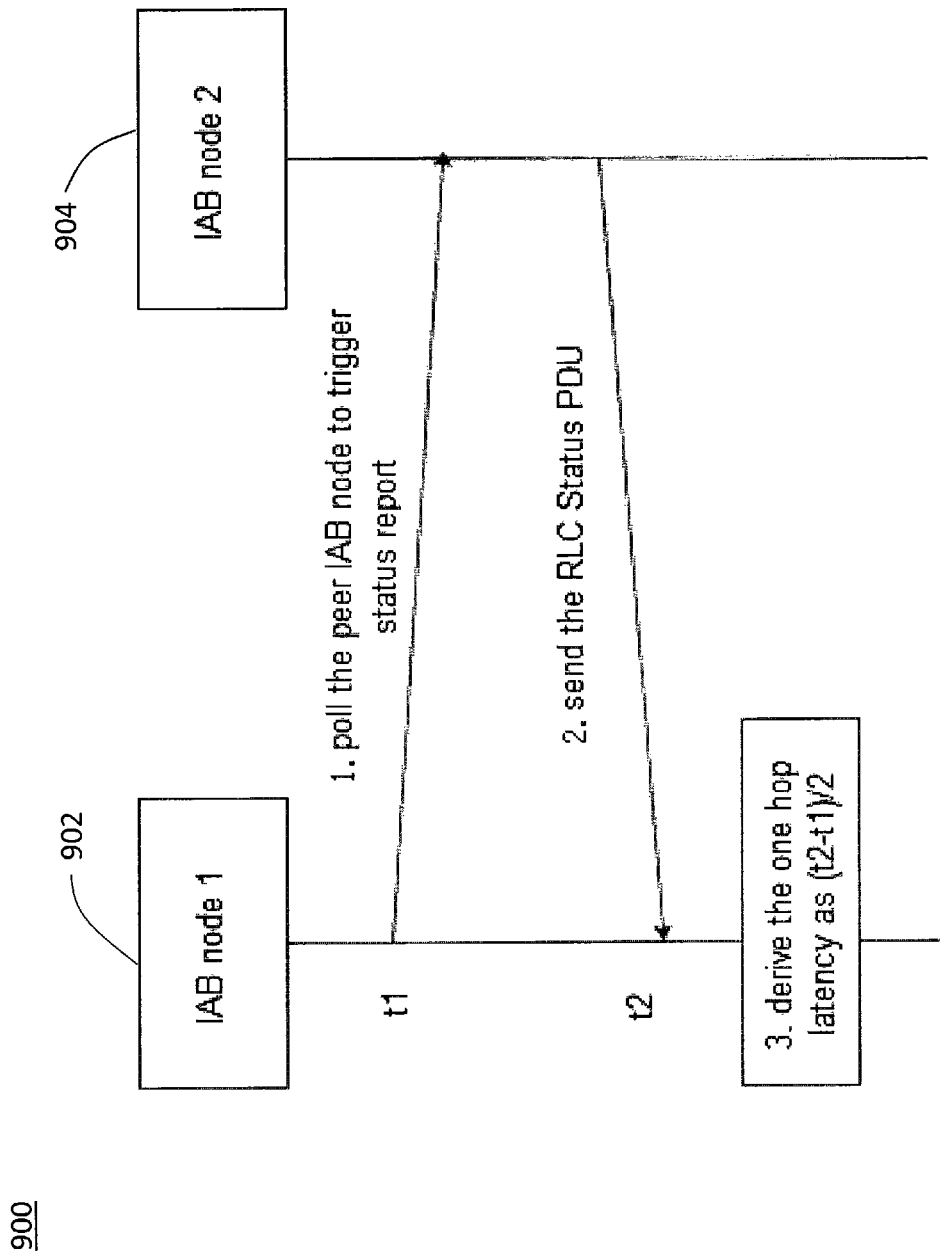
FIG. 9 illustrates a signaling diagram for a method of determining latency between two IAB nodes, in accordance with some embodiments of the invention.

FIG. 9 illustrates a signaling diagram 900 for a discard mechanism for IAB nodes to perform latency aware routing in a multi-hop IAB network, in accordance with some embodiments. In addition to the packet discard check along the multi-hop data path, as discussed above, latency aware routing can be performed, in accordance with various embodiments of the invention. When routing the data packet of a UE in an IAB network, the multi-hop data forwarding delay between IAB nodes should be considered for the total delay, which should be lower than the PDB. In order to support latency aware routing in a multi-hop IAB network, one should first consider how to obtain the potential per hop latency along different data forwarding paths. In some embodiments, a topology and routing management entity may collect the link connectivity, per hop link latency and radio conditions information. In various embodiments, the topology and routing management entity may be located in a donor CU, a donor IAB node or other network entity. Based on this information, the topology and routing management entity could determine the network topology and the routing of different data forwarding paths. Then the topology and routing management entity can configure the routing table to each MT part of an IAB node and/or DU part of the IAB node for subsequent latency aware data forwarding.

Referring to FIG. 9, a first IAB node 902 can poll its peer IAB node 904 in order to trigger STATUS reporting by the peer IAB node 904 (step 1). The peer IAB node 904 then sends a RLC STATUS report to the first IAB node 902 (step 2). The MT part of first IAB node 902 or DU part of the first IAB node 902 can then utilize this information to calculate a potential latency between them. For example, the MT part of the first IAB node 902 can poll its serving IAB node 904 and record the round trip time (RTT) between the transmission of RLC polling and reception of the RLC STATUS report. Then the latency corresponding to the RLC bearer between MT part of IAB node and its serving IAB node is calculated as RTT/2 (step 3).

Figure 10:
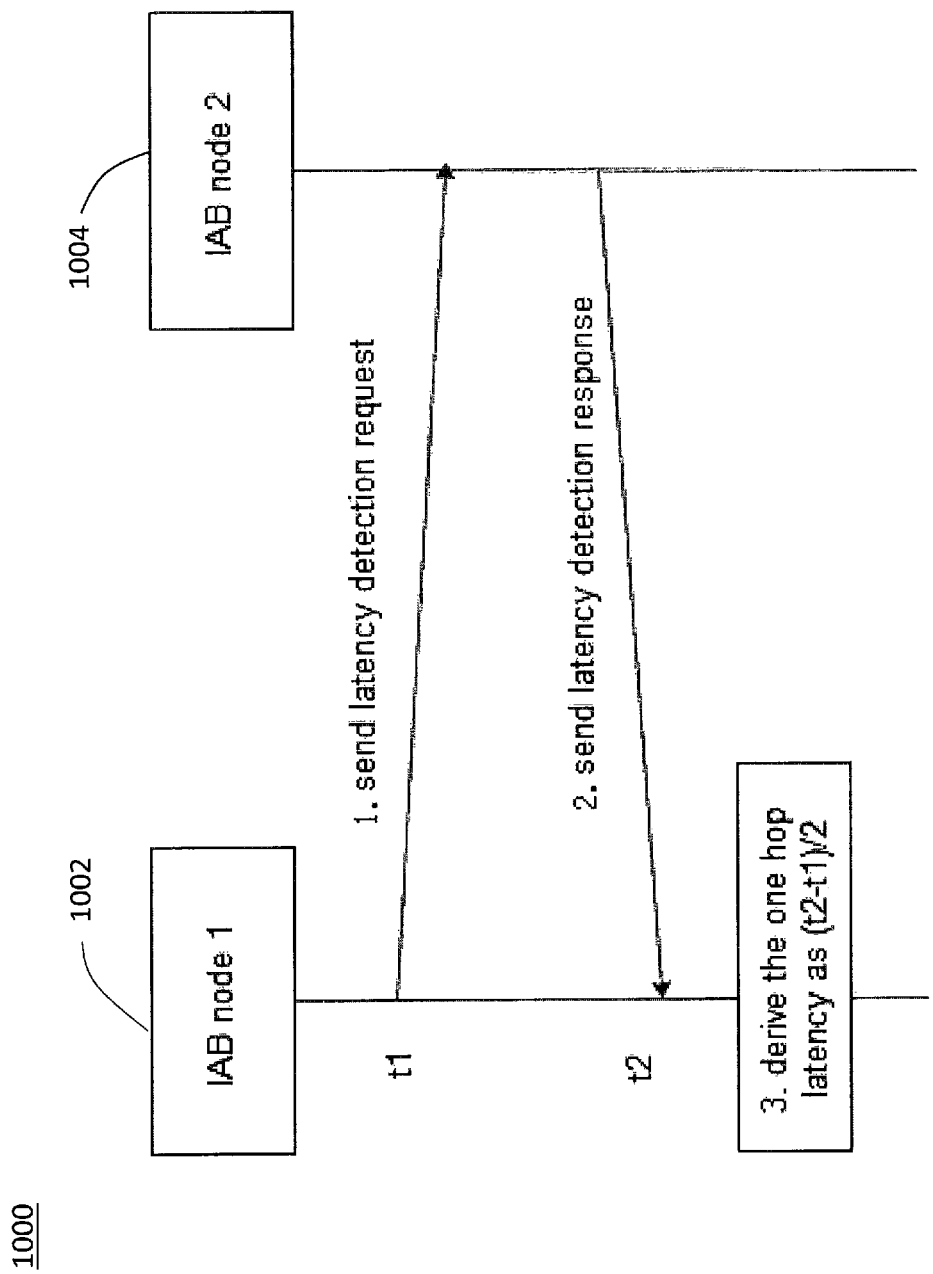
FIG. 10 illustrates a signaling diagram for a method of determining latency between two IAB nodes, in accordance with some embodiments of the invention.

FIG. 10 illustrates a signaling diagram 1000 for a method of determining latency between two IAB nodes, in accordance with some embodiments. In some embodiments, a first IAB node 1002 can send a latency detection request control packet data unit (PDU) (step 1) which requests a peer IAB node 1004 to send back a latency detection response control PDU (step 2). Then the first IAB node 1002 can determine the per hop latency based on calculating RTT/2, as discussed above (step 3). In addition, in some embodiments, the latency detection request control PDU contains the timestamp (t1) of when the control PDU is generated. Correspondingly, the latency detection response control PDU includes the same timestamp as latency detection request control PDU. Upon receiving the latency detection response control PDU, the first IAB node can record the current time (t2) and calculate the latency as ((t2−t1)/2).

In some embodiments, if the timing of all intermediate IAB nodes is synchronized, the first IAB node can send a latency detection control PDU including current timestamp information to the peer IAB node(s). The peer IAB nodes can then calculate the one way latency based on the time difference between the reception time and the timestamp included in the latency detection control PDU. In this case, only the latency detection control PDU is enough. On the other hand, the one way latency detection might be roughly estimated by the time difference between packets arrive time and packets departure time within one IAB node. A scheduler can apply information regarding the number of hops a packet has yet to traverse in addition to the QoS profile. However, in some embodiments, the actual latency is determined by not only number of hops, but also the congestion and packet priority. In order to predict the potential latency and check whether the PDB could be met for multihop IAB network, the average latency per RLC bearer/channel is determined for making routing and scheduling decisions. Moreover, in some embodiments, the latency detection procedure can be periodically triggered or event triggered. In yet further embodiments, considering the latency fluctuation, the average latency per RLC bearer might be a filtered value.

For example, suppose a donor CU supports the topology and routing management entity, the detected one hop latency could be reported to donor CU by a MT part of IAB node or DU part of the IAB node. In addition, the MT part of the IAB node or DU part of the IAB node might also report the link connectivity and radio conditions to donor CU. Based on the reported information, the donor CU can estimate the potential latency for different data forwarding paths and then configure the routing table to each MT part of the IAB nodes and/or DU part of IAB nodes in the path.

Figure 11:
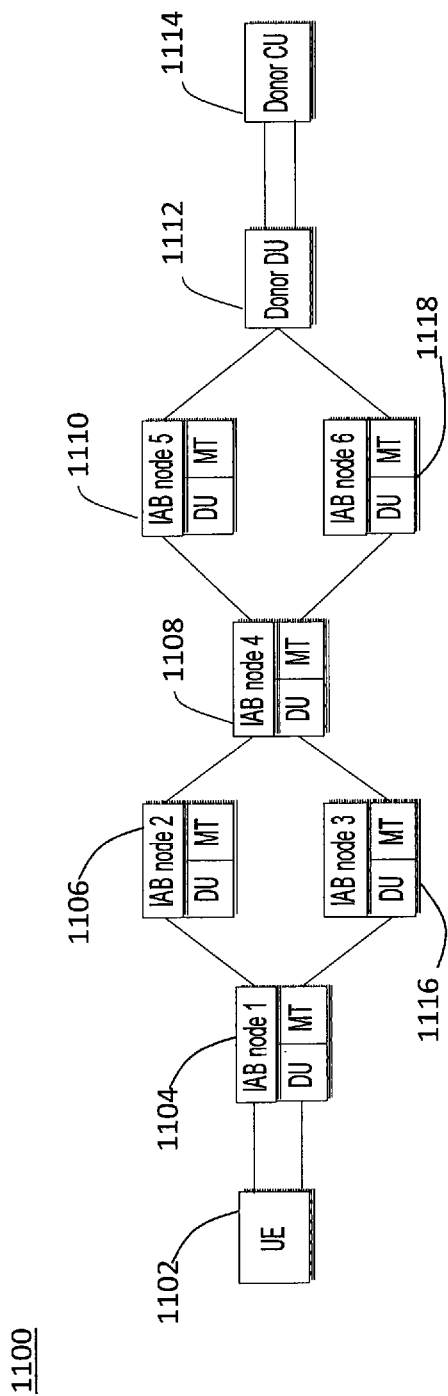
FIG. 11 illustrates an exemplary IAB network topology and corresponding routing table, in accordance with some embodiments of the invention.

FIG. 11 presents an example IAB network topology 1100 and a corresponding exemplary routing table configured for intermediate IAB node 1108, in accordance with some embodiments. The routing table contain the destination id, next hop ID, weight for each routing entry. Here the destination node ID denotes the destination DU ID or destination UE ID. For UL transmission, the next hop ID denotes the ID of IAB node's DU part that the data packet shall be forwarded to. For DL transmission, the next hop ID denotes the ID of the MT part of an IAB node, for example, C-RNTI. The weight denotes the relative cost for forwarding the data packet to the destination node. For example, it might be the estimated transmission latency from the current node to the destination node. In addition, the routing table might also contain the IAB bearer ID, which can be used to identify the different weight of IAB bearers over different paths.

In accordance with some embodiments, suppose the IAB node 1108 receives a data packet from an MT part of IAB node 1116 and the data packet is to be forwarded to donor DU 1112, IAB node 1108 could map this data packet to IAB bearer 1 of MT part based on the bearer mapping rules. IAB node 1108 might find two available routing entries in the routing table, routing entry 1 and 2 respectively. Suppose the remaining PDB associated with data packet is 10, then no path is qualified for the data transmission. This data packet could be discarded at IAB node 1108. Suppose the remaining PDB associated with this data packet is 16, IAB node 1108 could only select IAB node 1110 for its next hop forwarding since its weight is lower than the remaining PDB. On the other hand, suppose the remaining PDB associated with this data packet is 25, both IAB node 1110 and IAB node 1118 could be selected for its next hop. Which one to choose depends on the network configuration. For example, the network might require to choose the next hop with lowest weight or randomly choose one of the available path.

With regard to DL transmissions, suppose the MT part of IAB node 1108 receives a data packet from IAB node 1110 and the data packet is to be forwarded to the UE 1102 connected to IAB node 1104. Then the destination ID might be UE ID or DU ID of IAB node 1102. IAB node 1108 might find two available routing entries to the destination ID in the routing table, routing entry 5 and 6 respectively. Meanwhile, the data packet could be mapped to IAB bearer 2 with IAB node 1106 and IAB node 1116, respectively. The IAB node 1108 could derive the remaining PDB, compare it with the weight of each path, and determine whether to discard this packet or select a next hop to forward this data packet.

As discussed above, various embodiments for performing UE and IAB bearer management, and associated processes are described in the present disclosure. The IAB nodes, donor DU, and donor CU described in connection with the various embodiments, can be generally referred to as "wireless communication nodes" herein. In accordance with various embodiments, such wireless communication nodes may be implemented as a next Generation Node B (gNB), an E-UTRAN Node B (eNB), a donor IAB node, a serving IAB node, an intermediate IAB node, a donor DU, a donor CU, a Transmission/Reception Point (TRP), an Access Point (AP), and similar devices known in the art. A UE in the present disclosure can be referred to as a terminal and can include, or be implemented as, a mobile station (MS), a station (STA), a smartphone, a tablet, a laptop, etc.

Figure 12:
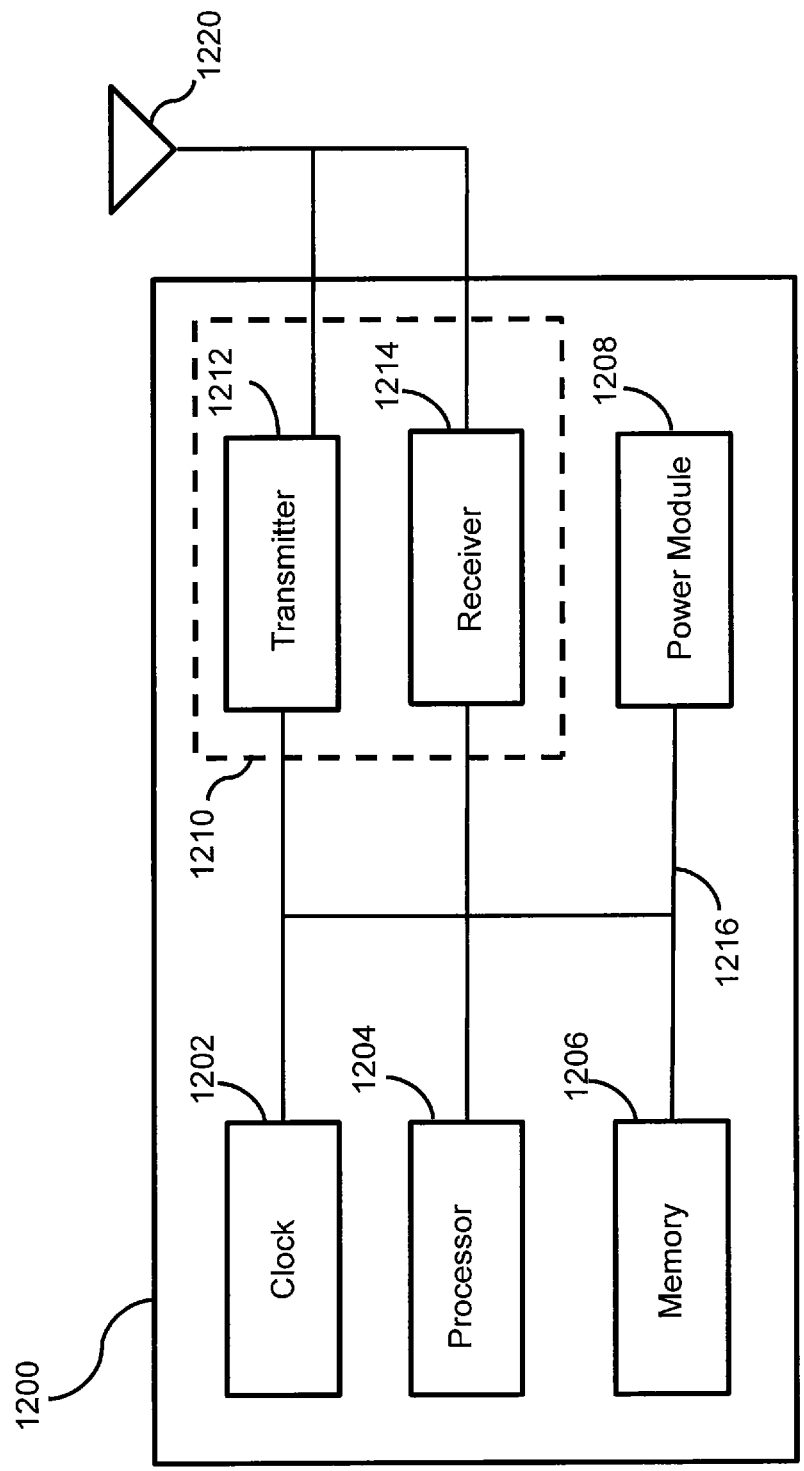
FIG. 12 illustrates a block diagram of a wireless communication node that may be used to perform the methods disclosed herein, in accordance with various embodiments of the invention.

FIG. 12 illustrates a block diagram of a wireless communication node 1200 capable of performing the methods disclosed herein, in accordance with some embodiments of the present disclosure. It is understood that node 1200 is merely an example of a communication node that can be configured to implement the various methods described herein. Additionally, for ease of illustration and discussion, all components, features or functional modules of the node 1200 are not necessarily shown.

As shown in FIG. 12, the wireless communication node 1200 includes a system clock 1202, a processor 1204, a memory 1206, a power module 1208 and a transceiver 1210 comprising a transmitter 1212 and a receiver 1214. Each of these components or modules are coupled to one another via a data and power bus 1216. At least one antenna 1220 is further coupled to the transceiver 1210.

The system clock 1202 provides the timing signals to the processor 1204 for controlling the timing of all operations of the wireless communication node 1200.

The processor 1204 controls the general operation of the node 1200 and can include one or more processing circuits or modules such as a central processing unit (CPU) and/or any combination of one or more general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data. In accordance with various embodiments, the processor 1204 can include one or more processors operating in cooperation to perform the logic and configuration functions described herein. For example, in some embodiments the processor 1204 is configured to determine DRBs and QoS flows mapped to the DRBs, respectively, that can be supported by respective communication nodes; and configure each of the respective communication nodes to support the DRBs and QoS flows.

The memory 1206, which can include both read-only memory (ROM) and random access memory (RAM), can provide instructions and data to the processor 1204, thereby converting the processor 1204 into a specially programmed processor capable of executing the process steps described herein. A portion of the memory 1206 can also include non-volatile random access memory (NVRAM). The processor 1204 typically performs logical and arithmetic operations based on program instructions stored within the memory 1206. The instructions (a.k.a., software) stored in the memory 1206 can be executed by the processor 1204 to perform the methods described herein. The processor 1204 and memory 1206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1210, which includes the transmitter 1212 and receiver 1214, allows the wireless communication node 1200 to transmit and receive data to and from a remote device (e.g., a UE, a IAB node, a donor DU, a donor CU, etc.). An antenna 1220 is typically attached to the housing of the node 1200 and electrically coupled to the transceiver 310. In various embodiments, the node 1200 includes (not shown) multiple transmitters, multiple receivers, and multiple transceivers. In one embodiment, the antenna 1220 is replaced with a multi-antenna array that can form a plurality of beams each of which points in a distinct direction. The transmitter 1212 can be configured to wirelessly transmit packets having different packet types or functions, such packets being generated by the processor 1204. Similarly, the receiver 1214 is configured to receive packets having different packet types or functions, and the processor 1204 is configured to process packets of a plurality of different packet types. For example, the processor 1204 can be configured to determine the type of packet and to process the packet and/or fields of the packet accordingly. The power module 1208 provides power to the system clock 1202, processor 1204, memory 1206 and transceiver 1210 to enable each to perform their respective functions, as described above. The power module 1208 can receive and transform power from an external source (e.g., a wall power outlet) and/or include one or more batteries for providing alternative or back-up power, using techniques and structures well-known in the art.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first wireless communication node, the method comprising:
    transmitting a data radio bearer (DRB) setup request message to each of at least one second wireless communication node, wherein the DRB setup request message contains an identity of a plurality of DRBs and at least one of a Quality of Service (QoS) flow and a user equipment (UE) data bearer mapped to each of the plurality of DRBs, respectively, and wherein the DRB setup request message further comprises routing configuration information, wherein the routing configuration information comprises:
    a plurality of routes, wherein each of the plurality of routes is between the first wireless communication node and a respective destination node from the at least one second wireless communication node, and
    a respective number of hops required for each of the plurality of routes, wherein the respective number of hops is used to determine packet delay budget (PDB) headroom in each of the plurality of routes;
    receiving a DRB setup response message from each of the at least one second wireless communication node, wherein each DRB setup response message contains a first list of at least one of QoS flows and UE data bearers failed to be setup by a respective one of the at least one second wireless communication node and a second list of at least one of QoS flows and UE data bearers successfully setup by the respective one of the at least one second wireless communication node;
    based on each of the first and second lists, determining at least one DRB, at least one UE data bearer and at least one QoS flow, wherein each of the at least one UE data bearer and the at least one QoS flow is mapped to the at least one DRB supported by each of the at least one second wireless communication node; and
    configuring each of the at least one second wireless communication node to support the at least one DRB and the at least one QoS flow or UE data bearer.

2. The method of claim 1, wherein the DRB setup request message further contains at least one of the following: identification (ID) of the UE, wherein the UE transmits and receives data packets forwarded by each of the at least one second wireless communication node, a UE data bearer ID, QoS parameters associated with the UE data bearer ID, an uplink (UL) UE aggregated max flow bit rate (AMBR), and a discard timer.

3. The method of claim 2, wherein the discard timer is configured by the first wireless communication node, wherein the discard timer expires when a latency associated with forwarding a data packet in a transmission path including the at least one second wireless communication node exceeds a predetermined threshold value, and wherein when the discard timer expires, the data packet is discarded.

4. The method of claim 2, wherein the QoS parameters comprise at least one of: a packet delay budget (PDB), a packet error rate (PER), a priority level, a delay critical indication, an average window period, a maximum data burst volume, a guaranteed bit rate (GBR), a 5G QoS Indicator (5QI), and QoS flow information (QFI).

5. The method of claim 1, wherein the routing configuration information comprises at least one of: a routing index, a transmission direction, a destination ID, a next hop ID, a weighting parameter associated with each respective route, a DRB ID associated with each respective route, and a logical channel identifier (LCD) associated with each respective route.

6. The method of claim 1, wherein the DRB setup response message contains, for each QoS flow contained in the first and second lists, at least one of: QoS flow information (QFI), identification (ID) of the UE, a UE bearer ID and a DRB ID.

7. The method of claim 1, wherein:
    the first wireless communication node comprises a donor Central Unit (CU) of a split-architecture network; and
    the at least one second wireless communication node comprises:
    a donor Distributed Unit (DU) of the split-architecture network; and an Integrated Access and Backhaul (IAB) node comprising a DU part and mobile terminated (MT) part; and wherein the donor CU transmits a DRB setup request message to each of the donor DU and the DU part of the IAB node, and receives a DRB setup response message from each of the donor DU and the DU part of the IAB node.

8. The method of claim 7, further comprising:
the donor DU transmitting a Radio Resource Control (RRC) reconfiguration message to the MT part of the IAB node, wherein the RRC reconfiguration message contains at least one of:
identification (ID) of the UE, a UE bearer ID, QoS flow or UE data bearer to DRB mapping information, QoS parameters and discard timer information;
receiving a RRC reconfiguration complete message from the MT part of the IAB node.

9. The method of claim 8, wherein the RRC reconfiguration message further comprising routing configuration information comprising at least one of: a routing index, a transmission direction, a destination ID, a next hop ID, a weighting parameter associated with each respective route, a number of hops required for each respective route and a DRB ID or logical channel identifier (LCD) associated with each respective route.

10. The method of claim 1, wherein:
the first wireless communication node comprises a donor Integrated Access and Backhaul (IAB) node; and
the at least one second wireless communication node comprises:
an intermediate IAB node; and
a serving IAB node directly connect to the UE; and
wherein the donor IAB node transmits a DRB setup request message to each of the intermediate and serving IAB nodes, and receives a DRB setup response message from each of the intermediate and serving IAB nodes.

11. The method of claim 1, wherein:
the first wireless communication node comprises a serving Integrated Access and Backhaul (IAB) node directly connected to the UE; and
the at least one second wireless communication node comprises:
a donor IAB node; and
an intermediate IAB node disposed between serving IAB node and the donor IAB node in a transmission path for forwarding data packets to the UE from a core network; and
wherein the serving IAB node transmits a DRB setup request message to each of the donor and intermediate IAB nodes, and receives a DRB setup response message from each of the donor and intermediate IAB nodes.

12. A first wireless communication node, comprising:
a transceiver configured to:
transmit a data radio bearer (DRB) setup request message to each of at least one second wireless communication node, wherein the DRB setup request message contains an identity of a plurality of DRBs and at least one of a Quality of Service (QoS) flow and a User Equipment (UE) data bearer mapped to each of the plurality of DRBs, respectively, and wherein the DRB setup request message further comprises routing configuration information, wherein the routing configuration information comprises:

a plurality of routes, wherein each of the plurality of routes is between the first wireless communication node and a respective destination node from the at least one second wireless communication node, and
a respective number of hops required for each of the plurality of routes, wherein the respective number of hops is used to determine packet delay budget (PDB) headroom in each of the plurality of routes; and receiving a DRB setup response message from each of the at least one second wireless communication node, wherein each DRB setup response message contains a first list of at least one of QoS flows and UE data bearers that failed to be setup by a respective one of the at least one second wireless communication node and a second list of at least one of QoS flows and UE data bearers that were successfully setup by the respective one of the at least one second wireless communication node;

at least one processor, coupled to the transceiver, wherein the at least one processor is configured to:
based on each of the first and second lists, determine at least one DRB, at least one UE data bearer and at least one QoS flow, wherein each of the at least one UE data bearer and the at least one QoS flow is mapped to the at least one DRB supported by each of the at least one second wireless communication node; and
configure each of the at least one second wireless communication node to support the at least one DRB and the at least one QoS flow or UE data bearer.

13. The first wireless communication node of claim 12, wherein the DRB setup request message further contains at least one of the following: identification (ID) of the UE, wherein the UE transmit and receive data packets forwarded by each of the at least one second wireless communication node, a UE data bearer ID, QoS parameters associated with the UE data bearer ID, an uplink (UL) UE aggregated max flow bit rate (AMBR), and a discard timer.

14. The first wireless communication node of claim 13, wherein the discard timer is configured by the first wireless communication node, wherein the discard timer expires when a latency associated with forwarding a data packet in a transmission path including the at least one second wireless communication node exceeds a predetermined threshold value, and wherein when the discard timer expires, the data packet is discarded.

15. The first wireless communication node of claim 13, wherein the QoS parameters comprise at least one of: a packet delay budget (PDB), a packet error rate (PER), a priority level, a delay critical indication, an average window period, a maximum data burst volume, a guaranteed bit rate (GBR), 5G QoS Indicator (5QI) and QoS flow information (QFI).

16. The first wireless communication node of claim 12, wherein the DRB setup request message further contains at least one of UE data bearer to DRB mapping information.

17. The first wireless communication node of claim 12, wherein the routing configuration information comprises at least one of: a routing index, a transmission direction, a destination ID, a next hop ID, a weighting parameter associated with each respective route and a DRB ID or logical channel identifier (LCD) associated with each respective route.

18. The first wireless communication node of claim 12, wherein the DRB setup response message contains, for each QoS flow contained in the first and second lists, at least one of: QoS flow information (QFI), identification (ID) of the UE, a UE bearer ID and a DRB ID.

19. The first wireless communication node of claim 12, wherein:
- the first wireless communication node comprises a donor Central Unit (CU) of a split-architecture network; and
- the at least one second wireless communication node comprises:
  - a donor Distributed Unit (DU) of the split-architecture network; and
  - an Integrated Access and Backhaul (IAB) node comprising a DU part and mobile terminated (MT) part; and
- wherein the donor CU transmits a DRB setup request message to each of the donor DU and the DU part of the IAB node, and receives a DRB setup response message from each of the donor DU and the DU part of the IAB node.

* * * * *